US010909450B2

(12) United States Patent
Chen et al.

(10) Patent No.: US 10,909,450 B2
(45) Date of Patent: Feb. 2, 2021

(54) MULTIPLE-ACTION COMPUTATIONAL MODEL TRAINING AND OPERATION

(71) Applicant: Microsoft Technology Licensing, LLC, Redmond, WA (US)

(72) Inventors: Jianshu Chen, Redmond, WA (US); Li Deng, Redmond, WA (US); Jianfeng Gao, Woodinville, WA (US); Xiadong He, Sammamish, WA (US); Lihong Li, Redmond, WA (US); Ji He, Seattle, WA (US); Mari Ostendorf, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 813 days.

(21) Appl. No.: 15/084,113

(22) Filed: Mar. 29, 2016

(65) Prior Publication Data

US 2017/0286860 A1    Oct. 5, 2017

(51) Int. Cl.
*G06N 3/08*    (2006.01)
*G06N 3/04*    (2006.01)

(52) U.S. Cl.
CPC ............. *G06N 3/08* (2013.01); *G06N 3/0454* (2013.01)

(58) Field of Classification Search
CPC ........ G06N 3/0454; G06N 3/049; G06N 3/08; G06N 3/088; G06F 17/2785; G06F 17/30864; G06F 19/24
See application file for complete search history.

(56) References Cited

U.S. PATENT DOCUMENTS

| 6,701,318 B2 | 3/2004 | Fox et al. |
| 7,685,084 B2 | 3/2010 | Sisk et al. |
| 7,716,216 B1 | 5/2010 | Hank et al. |
| 7,840,569 B2 | 11/2010 | Meyerzon et al. |

(Continued)

FOREIGN PATENT DOCUMENTS

| WO | WO2014127812 | 8/2014 |
| WO | WO2014134617 | 9/2014 |

OTHER PUBLICATIONS

U.S. Appl. No. 62/254,684, filed Nov. 2015, Wang; Ziyu.*

(Continued)

*Primary Examiner* — Vincent Gonzales
*Assistant Examiner* — Marshall L Werner
(74) *Attorney, Agent, or Firm* — Schwegman Lundberg & Woessner, P.A.

(57) ABSTRACT

A processing unit can determine a first feature value corresponding to a session by operating a first network computational model (NCM) based part on information of the session. The processing unit can determine respective second feature values corresponding to individual actions of a plurality of actions by operating a second NCM. The second NCM can use a common set of parameters in determining the second feature values. The processing unit can determine respective expectation values of some of the actions of the plurality of actions based on the first feature value and the respective second feature values. The processing unit can select a first action of the plurality of actions based on at least one of the expectation values. In some examples, the processing unit can operate an NCM to determine expectation values based on information of a session and information of respective actions.

16 Claims, 12 Drawing Sheets

(56) References Cited

U.S. PATENT DOCUMENTS

| | | |
|---|---|---|
| 8,229,948 B1 | 7/2012 | Ershov |
| 8,266,144 B2 | 9/2012 | Tankovich et al. |
| 8,321,431 B2 | 11/2012 | Quick et al. |
| 8,359,282 B2 | 1/2013 | Bai et al. |
| 8,392,436 B2 | 3/2013 | Bai et al. |
| 8,504,361 B2 | 8/2013 | Collobert et al. |
| 8,504,493 B2 | 8/2013 | Jones, III |
| 8,924,318 B2 | 12/2014 | Newnham et al. |
| 2002/0129015 A1 | 9/2002 | Caudill et al. |
| 2005/0004905 A1 | 1/2005 | Dresden |
| 2005/0278362 A1 | 12/2005 | Maren et al. |
| 2006/0026013 A1 | 2/2006 | Kraft |
| 2006/0277033 A1 | 12/2006 | Gao et al. |
| 2007/0124263 A1 | 5/2007 | Katariya et al. |
| 2007/0136281 A1 | 6/2007 | Li et al. |
| 2007/0203869 A1 | 8/2007 | Ramsey et al. |
| 2008/0140644 A1 | 6/2008 | Franks et al. |
| 2008/0243820 A1 | 10/2008 | Chang et al. |
| 2009/0019034 A1 | 1/2009 | Franks et al. |
| 2009/0125501 A1 | 5/2009 | Gao et al. |
| 2009/0259651 A1 | 10/2009 | Tankovich et al. |
| 2009/0276414 A1 | 11/2009 | Gao et al. |
| 2009/0282022 A1 | 11/2009 | Bennett |
| 2010/0153315 A1 | 6/2010 | Gao et al. |
| 2010/0161641 A1 | 6/2010 | Gustafson et al. |
| 2010/0205974 A1* | 8/2010 | Schneegass ............... F02C 9/00 60/772 |
| 2010/0250547 A1 | 9/2010 | Grefenstette et al. |
| 2010/0318531 A1 | 12/2010 | Gao et al. |
| 2011/0208709 A1 | 8/2011 | Holthausen |
| 2011/0208735 A1 | 8/2011 | Gao et al. |
| 2011/0270604 A1 | 11/2011 | Qi et al. |
| 2011/0276390 A1 | 11/2011 | Li et al. |
| 2011/0276599 A1 | 11/2011 | Connor |
| 2012/0036015 A1 | 2/2012 | Sheikh |
| 2012/0158621 A1 | 6/2012 | Bennett et al. |
| 2012/0254217 A1 | 10/2012 | Ali et al. |
| 2012/0254218 A1 | 10/2012 | Ali et al. |
| 2013/0103493 A1 | 4/2013 | Gao et al. |
| 2013/0124492 A1 | 5/2013 | Gao et al. |
| 2013/0159320 A1 | 6/2013 | Gao et al. |
| 2013/0166303 A1 | 6/2013 | Chang et al. |
| 2013/0239006 A1 | 9/2013 | Tolkachev |
| 2014/0180975 A1 | 6/2014 | Martinez et al. |
| 2014/0201126 A1 | 7/2014 | Zadeh et al. |
| 2014/0279773 A1 | 9/2014 | Chen et al. |
| 2014/0359197 A1 | 12/2014 | Franceschini et al. |
| 2015/0074027 A1 | 3/2015 | Huang et al. |
| 2015/0100530 A1* | 4/2015 | Mnih ................... G06N 3/0454 706/25 |
| 2015/0170640 A1 | 6/2015 | Sak et al. |
| 2015/0278686 A1 | 10/2015 | Cardinaux et al. |
| 2015/0293976 A1 | 10/2015 | Guo et al. |
| 2015/0328553 A1 | 11/2015 | Xu |
| 2017/0140266 A1* | 5/2017 | Wang ................... G06N 3/0472 |

OTHER PUBLICATIONS

Silver et al., Concurrent Reinforcement Learning from Customer Ineractions Proceedings of the 30th International Conference on Machine Learning, 2013. (Year: 2013).*

Wang et al., Dueling NEtwork Architectures for Deep Reinforcement Learning, ICLR 2016, Jan. 2016. (Year: 2016).*

Shen et al., Learning Semantic Representations Using Convolutional Neural Networks for Web Search, WWW '14 Companion, pp. 373-374, Apr. 2014. (Year: 2014).*

Doya et al., Multiple Model-Based Reinforcement Learning, Neural Computation 14, p. 1347-1369, 2002. (Year: 2002).*

Silver et al., Concurrent Reinforcement Learning from Customer Interactions Proceedings of the 30th International Conference on Machine Learning, 2013. (Year: 2013).*

Branavan et al., Learning to Win by Reading Manuals in a Monte-Carlo Framework, Journal of Artificial Intelligence Research vol. 43, pp. 661-704, 2012. (Year: 2012).*

Henderson et al., Hybrid Reinforcement/Supervised Learning for Dialog Policies from Communicator Data, 4th IJCAI Workshop on Knowledge and Reasoning in Practical Dialogue Systems, Aug. 2005. (Year: 2005).*

Socher, R., "Recursive Deep Learning for Natural Language Processing and Computer Vision", Doctoral Dissertation of Stanford University, Aug. 2014, 204 pages.

Sutton, et al., "Reinforcement Learning: An Introduction", Publication of MIT Press, Feb. 1998, 398 pages.

Tesauro, Gerald, "Temporal difference learning and TD-Gammon", In Magazine of the Communications of the ACM, vol. 38, Issue 3, Mar. 1995, pp. 58-68.

Theocarous, et al., "Personalized Ad Recommendation Systems for Life-Time Value Optimization with Guarantees," Proceedings of the Twenty-Fourth Intl Joint Conference on Artificial Intelligance, 2015, pp. 1806-1812.

Watkins, et al., "Q-Learning", Journal of Machine Learning, vol. 8, Issue 3-4, May 1992, pp. 55-68.

U.S. Appl. No. 14/985,017, filed Dec. 30, 2015, Gao, et al., "Multi-Model Controller."

Adams, E., "Fundamentals of Game Design", Publication of New Riders Publishing, Retrieved on Jan. 11, 2016.

Bakker, Bram, "Reinforcement Learning with Long Short-Term Memory", In Proceedings of Advances in Neural Information Processing Systems, Dec. 3, 2001, 8 pages.

Bello, et al., "Learning Control Policies from High-Dimensional Visual Inputs", retrieved Jan. 6, 2016, at <http://cs231n.stanford.edu/reports/ibello_yegor_paper.pdf>.

Bengio, Y., et al., "A Neural Probabilistic Language Model," The Journal of Machine Learning Research, vol. 3, 2003, pp. 1137-1155.

Berry, et al., "Data Mining Techniques: For Marketing, Sales, and Customer Relationship Management", In Publication of John Wiley & Sons, Mar. 2004, 672 pages.

Branavan, et al., "Learning to Win by Reading Manuals in a Monte-Carlo Framework", Proceedings of the 49th Annual Meeting of the Association for Computational Linguistics: Human Language Technologies, vol. 1, Jun. 19, 2011, pp. 268-277.

Branavan, Reinforcement Learning for Mapping Instructions to Actions, Proceedings of the 47th Annual Meeting of the ACL and the 4th IJCNLP of the AFNLP, Aug. 2, 2009, pp. 82-90.

Busoniu, et al., "Reinforcement Learning and Dynamic Programing Using Function Approximators", Publication of CRC Press, Apr. 29, 2010, pp. 49-53.

Collobert et al., "A Unified Architecture for Natural Language Processing: Deep Neural Networks with Multitask Learning", in the Proceedings of the 25th International Conference on Machine Learning, Jul. 2008, pp. 160-167.

Dahl, et al., "Context-Dependent Pre-Trained Deep Neural Networks for Large-Vocabulary Speech Recognition", IEEE Transactions on Audio, Speech & Language Processing, vol. 20, No. 1, Jan. 2012, pp. 30-42.

Deng, et al., "Deep Learning: Methods and Applications", In Journal of Foundations and Trends in Signal Processing, vol. 7, Issue 34, Jun. 2014, 197 pages.

Deng, et al., "Recent Advances in Deep Learning for Speech Research at Microsoft", In Proceedings of IEEE International Conference on Acoustics, Speech, and Signal Processing, May 26, 2015, 5 pages.

Dwyer, F. Robert, "Customer Lifetime Valuation to Support Marketing Decision Making", In Journal of Direct Marketing, vol. 11, Issue 4, Jan. 1997, 2 pages.

Esposito, G., "Regularized Approximate Policy Iteration Using Kernel for On-Line Reinforcement Learning", PhD Thesis of Polytechnic University of Catalonia, Jun. 2015, pp. 27 and 28.

Hasselt, et al., "Deep Reinforcement Learning with Double Q-learning", Proceedings of the Computing Research Repository, Sep. 2015, 13 pages.

Hausknecht, et al., "Deep Recurrent Q-Learning for Partially Observable MDPs", In Journal of Computing Research Repository, Jul. 2015, 9 pages.

(56) References Cited

OTHER PUBLICATIONS

Hinton, et al., "Deep Neural Networks for Acoustic Modeling in Speech Recognition: The Shared Views of Four Research Groups", IEEE Signal Processing Magazine, vol. 29, No. 6, Nov. 2012, pp. 82-97.

Hochreiter, et al., "Long Short-Term Memory", In Journal of Neural Computation, vol. 9, Issue 8, Nov. 15, 1997, pp. 1-32.

Huang, et al., "Learning Deep Structured Semantic Models for Web Search Using Clickthrough Data", Proceedings of the 22nd ACM International Conference on Information & Knowledge Management, Oct. 27, 2013, pp. 2333-2338.

Kaelbling, et al., "Planning and Acting in Partially Observable Stochastic Domains", In Journal of Artificial Intelligence, vol. 101, Issues 12, May, 1998, pp. 99-134.

Kanani, et al., "Selecting Actions for Resource-bounded Information Extraction Using Reinforcement Learning", Proceedings of the Fifth ACM International Conference on Web Search and Data Mining, Feb. 8, 2012, 10 pages.

Kiros, et al., "Skip-Thought Vectors", Proceedings of CORR, Jun. 2015, pp. 1-11.

Krizhevsky, et al., "Imagenet Classification with Deep Convolutional Neural Networks", Proceedings of 26th Annual Conference on Neural Information Processing Systems, Dec. 3, 2012, pp. 1-9.

Kumar, et al., "Customer Relationship Management: Concept, Strategy, and Tools", In Publication of Springer-Verlag Berlin Heidelberg, Oct. 21, 2012, 2 pages.

Lagoudakis, et al., "Least-Squares Policy Iteration", In Journal of Machine Learning Research, Dec. 2003, pp. 1107-1149.

Le, et al., "Distributed Representations of Sentences and Documents", Proceedings of the 31st International Conference on Machine Learning, Jun. 21, 2014, 9 pages.

LeCun et al., "Deep Learning", in the Journal of Nature, vol. 521, No. 7553, May 2015, pp. 436-444.

Li, et al., "Recurrent Reinforcement Learning: A Hybrid Approach", Proceedings of CORR, Sep. 2015, pp. 1-11.

Lillicrap, et al., "Continuous Control With Deep Reinforcement Learning", Proceedings of CORR, Sep. 2015, pp. 1-14.

Lin, Long-Ji, "Reinforcement learning for robots using neural networks", In Ph.D. Dissertation of Doctor of Philosophy, Jan. 6, 1993, 168 pages.

Lin, L-J., "Reinforcement Learning for Robots Using Neural Networks", Doctoral Dissertation, Jan. 6, 1993, 168 pages.

Marivate, Vukosi N., "Improved Empirical Methods in Reinforcement-Learning Evaluation", In Doctoral Dissertation of Doctor of Philosophy, Jan. 2015, 148 pages.

Matiisen, T., "Computational Neuroscience Lab," Published Dec. 19, 2015, available at <http://neuro.cs.ut.ee/demystifying-deep-reinforcement-learning/>.

McCallum, Andrew Kachites, "Reinforcement learning with selective perception and hidden state", In PhD Thesis of Doctor of Philosophy, Retrieved on: Oct. 8, 2015, 157 pages.

Mikolov, et al., "Efficient Estimation of Word Representations in Vector Space", Proceedings of Computing Research Repository, Jan. 2013, pp. 1-12.

Mnih, et al., "Human-Level Control through Deep Reinforcement Learning", In Journal of Nature, vol. 518, Issue 7540, Feb. 2015, 5 pages.

Mnih, et al., "Playing Atari with Deep Reinforcement Learning", Proceedings of Computing Research Repository, Dec. 2013, pp. 1-9.

Mnih et al., "Three New Graphical Models for Statistical Language Modelling", in the Proceedings of the 24th International Conference on Machine Learning, Jun. 2007, pp. 641-648.

Narasimhan, et al., "Language Understanding for Text-based Games Using Deep Reinforcement Learning", Proceedings of the Conference on Empirical Methods in Natural Language Processing, Sep. 17, 2015, pp. 1-11.

Netzer, et al., "A Hidden Markov Model of Customer Relationship Dynamics", In Journal of Marketing Science, vol. 27, Issue 2, Mar. 2008, pp. 185-204.

Oh, et al., "Action-conditional video prediction using deep networks in Atari games", In Proceedings of Computer Research Repository, Jul. 2015, pp. 1-43.

Oliehoek, F.A., "Formalization of Regression to Factored Q-Value Functions", PhD Thesis of Amsterdam University Press, Feb. 8, 2010, 9 pages.

Pednault, et al., "Sequential cost-sensitive decision-making with reinforcement learning", In Proceedings of the Eighth ACM SIGKDD International Conference on Knowledge Discovery and Data Mining, Jul. 23, 2002, 10 pages.

Penningtion, et al., "GloVe: Global Vectors for Word Representation", Proceedings of the Empiricial Methods in Natural Language Processing, vol. 12, Oct. 2014, 12 pages.

Pineau, et al., "Point-based value iteration: An anytime algorithm for POMDPs", In Proceedings of the 18th international joint conference on Artificial Intelligence, Aug. 9, 2003, 6 pages.

Schafer, Anton M., "Reinforcement Learning with Recurrent Neural Network", In PhD Thesis, Oct. 31, 2008, 112 pages.

Scheffier, et al., "Automatic Learning of Dialogue Strategy Using Dialogue Simulation and Reinforcement Learning", Proceedings of the Second International Conference on Human Language Technology Research, Mar. 24, 2002, 7 pages.

Silver, et al., "Concurrent reinforcement learning from customer interactions", In Proceedings of the 30th International Conference on Machine Learning, Jun. 16, 2013, 9 pages.

Singh, et al., "Reinforcement Learning for Spoken Dialogue Systems", Proceedings of Advances in Neural Information Processing Systems, Nov. 29, 1999, 7 pages.

* cited by examiner

MULTIPLE-ACTION COMPUTATIONAL MODEL TRAINING AND OPERATION

BACKGROUND

Users increasingly turn to computing services, such as Web search engines, for information or for answers to specific questions. However, many such computing systems interact with users exclusively via text. For example, Web search services generally receive textual input of search terms. As a result, users' interactions with existing computing services and other text-based computer systems are limited by the textual processing capability of the system. Moreover, existing schemes for information retrieval using textual queries place the burden on the user to express the intent of the user's query in a way compatible with the system's textual processing model, even if the user does not have any knowledge of that model.

SUMMARY

This disclosure describes systems, methods, and computer-readable media for training computational models, such as neural networks (NNs), via reinforcement learning (RL), and for using the trained computational models in, e.g., determining actions to take during a session, e.g., a communication session with an entity, e.g., a user of a computing service. In some examples, a computing device operates a first network computational model (NCM) based at least in part on information of a session to provide a first feature value corresponding to the session, and operates a second NCM to provide respective second feature values corresponding to individual actions of a plurality of actions. The computing device determines respective expectation values of at least some of the actions of the plurality of actions based at least in part on the first feature value and the respective second feature values, and selects a first action of the plurality of actions based at least in part on at least one of the expectation values. The computing device provides an indication of the first action via a communications interface. The computing devices determines result information and determines a result value based at least in part on the result information. The computing device trains the first NCM based at least in part on the first action and the result value to provide a third NCM, and trains the second NCM based at least in part on the first action and the result value to provide a fourth NCM. According to example techniques herein, the computing device can operate a network computational model (NCM) to separately determine respective expectation values for actions of a plurality of actions, individual expectation values determined based at least in part on information of a state of a session, common parameters of the NCM, and information of the respective action of the plurality of actions.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Figure 1:
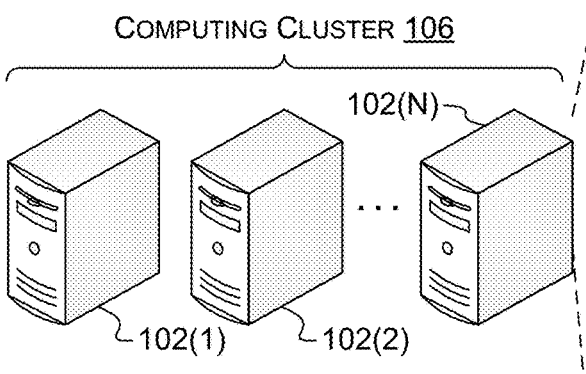
FIG. 1 is a block diagram depicting example scenarios for implementing training and operation of computational models as described herein.
Figure 1:
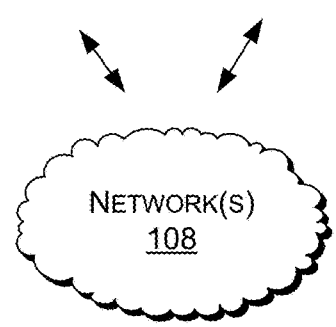
Figure 1:
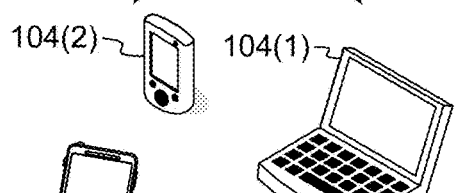
Figure 1:
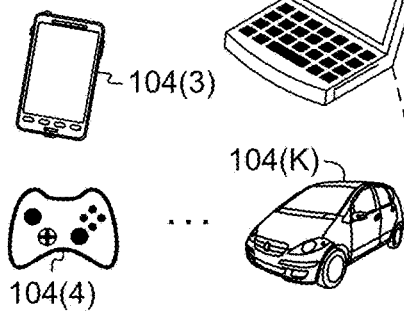
Figure 1:
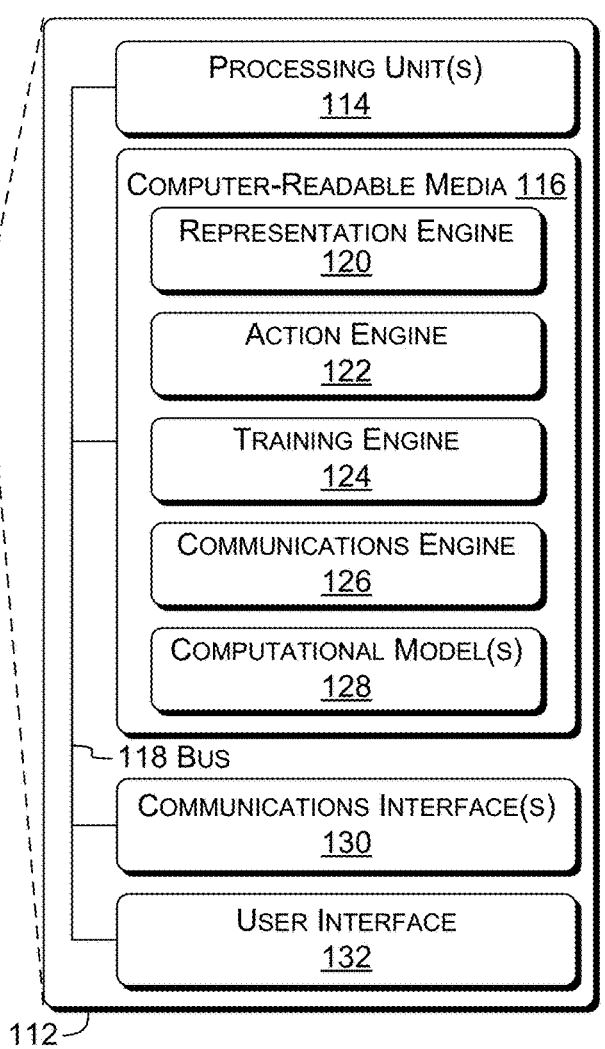
Figure 1:
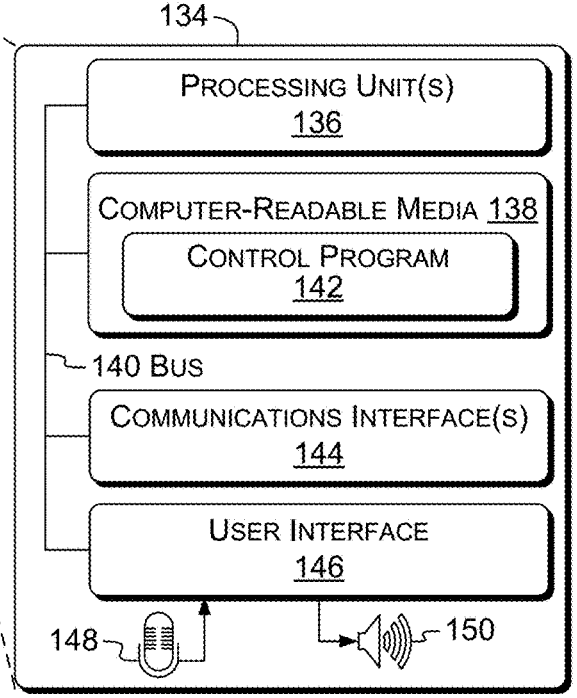

Examples described herein provide techniques and constructs to improve the training and operation of computational models (CMs), e.g., neural networks (NNs). Examples described herein provide techniques and constructs to permit a computing system to more effectively understand user queries and provide relevant information. For example, users searching online for a movie, such as "The Martian," may be interested in tickets for tonight, showtimes for this weekend, cast and crew information, or the novel on which the movie is based. Examples herein employ computational models to more effectively understand intent of a user query and provide relevant results. Examples herein operate over the course of multiple interactions with a user to adapt the system to the user's expressions, reducing the need for the user to understand the system's internal model in order to obtain effective results. Examples herein can reduce the number of system interactions required by the user to achieve the user's goals, thus reducing the bandwidth required for communication between the system and the user.

Some examples use a network computational model (NCM). Example NCMs can include neural networks trained using a reinforcement-learning update rule. Some examples use such networks to determine an action to be taken based on state information of a session of user interaction with the system. Example actions can include transmitting specific information to the user. In some examples, subsequent to, or in response to, taking the determined action, the system can receive or determine a result value (a "reward") and a new state of the session. The system can then update parameters of NCMs or other computational models to more accurately reflect the result value provided by each action in a particular state. In some examples, the result value is provided by a user or otherwise indicates how valuable the action was to the user. In an example of a Web-search system, the state can include the query "the martian movie." For a user searching for tonight's showtimes and tickets, an action including connecting to a ticket-purchasing site is associated with a high result value in this example. An action including presenting cast and crew information to the user is associated with a low result value in this example.

Accordingly, some examples herein permit determining actions of a computing system, e.g., results to be presented to a user, based on both short- and long-term contributions to assisting the user, rather than merely based on textual understanding of a single user query. Using reinforcement learning permits tracking state over a period of time, rather than only a most-recent observation of the user. Moreover, some examples further use a recurrent computational model (RCM) such as a recurrent neural network (RNN) to transform observations of the user, e.g., queries from the user, into state information. Using RCMs to determine state information can permit understanding order-sensitive user inputs or other order-sensitive portions of the state, e.g., the difference between the sentences "I am ready" and "Am I ready?"

For brevity, some examples herein are described with reference to the context of a Web search service, e.g., BING or GOOGLE. However, these examples are not limiting. Other contexts in which examples herein can be applied can include question-answering services; online help systems; technical-support systems; voice-based assistants, such as CORTANA, SIRI, or GOOGLE NOW; dialog-based personal assistant software, e.g., interacting with a user via a text interface; software agents executing on computing devices such as desktops or smartphones; artificial intelligence for, e.g., non-player characters presented and automatically controlled in a gaming-style user interface; navigation or other informational kiosks, e.g., in museums; customer-service terminals such as airline check-in terminals at airports; or instant-messaging services.

Some examples train multiple computational models using coordinated training processes. This can permit training and operating computational models with more efficient usage of processing units and memory, e.g., since each individual computational model is smaller than would be a combined model. Moreover, coordinated training of multiple computational models, in some examples, can permit the individual computational models to more effectively represent respective aspects of the session, e.g., state and possible actions. Some examples use one computational model to evaluate state and another to evaluate possible actions the system can take. Compared to prior schemes that evaluate all possible actions in a particular state with one computational model, some examples herein provide more flexibility in representing the state and possible actions in that state, which can increase model accuracy. In some examples using a NCM for state and a separate NCM to evaluate actions, coordinated training can improve the robustness of the trained models compared to prior schemes.

Various entities, configurations of electronic devices, and methods for training and using computational models, e.g., for user-service applications, are described further with reference to FIGS. 1-12. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

FIG. 1 shows an example scenario 100 in which examples of computational model training systems, e.g., deep neural network (DNN) training systems or multi-model training systems, can operate and/or in which computational-model training and/or use methods such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as MICROSOFT AZURE, GOOGLE CLOUD PLATFORM, or another cluster computing system ("computing cluster" or "cluster") having several discrete computing nodes (device(s) 102) that work together to accomplish a computing task assigned to the cluster as a whole. In the illustrated example, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), represented graphically as a gamepad), automotive computers such as vehicle control systems, vehicle security systems, and/or electronic keys for vehicles (e.g., 104(K), represented graphically as an automobile), desktop computers, and/or integrated components for inclusion in computing devices, appliances, and/or other computing device(s) configured to participate in and/or carry out computational-model training and/or operation as described herein, e.g., for control purposes. In some examples, as indicated, computing device(s), e.g., computing devices 102(1) and 104(1), can intercommunicate to participate in and/or carry out computational-model training and/or operation as described herein. For example, computing device 104(K) can be or include a data source operated by a user and computing device 102(1) can be a computational-model training and operation system, as described below with reference to, e.g., FIGS. 2-12.

Different devices and/or types of computing devices 102 and 104 can have different needs and/or ways of interacting with cluster 106. For example, computing devices 104 can interact with cluster 106 with discrete request/response communications, e.g., for queries and responses using an already-trained model. Additionally and/or alternatively, computing devices 104 can be data sources and can interact with cluster 106 with discrete and/or ongoing transmissions of data to be used as input to a computational model. For example, a data source in an automobile, e.g., a computing device 104(K) associated with an interactive voice-response system in the automobile, can provide to cluster 106 data of location and environmental conditions around the car. This can provide improved accuracy of actions taken by vehicle control systems by increasing the amount of state data input to the computational model. Additionally and/or alternatively, computing devices 104 can be data sinks and can interact with cluster 106 with discrete and/or ongoing requests for data output from a computational model, e.g., updates to driving directions based on changing traffic conditions.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction. An example data source can be a real-time data and/or video stream from a drone and/or other remotely-operated vehicle or from a webcam. Such a video stream can be carried via high-bandwidth, low-latency networks. By contrast, low-bandwidth networks can be used to carry textual queries from users, or data such as measurements from environmental sensors such as temperature sensors. Such sensors can provide infrequent updates, e.g., one value per minute of a gradually changing temperature.

In some examples, computing devices 102 and/or 104, e.g., laptops, smartphones, and/or other computing devices 102 and/or 104 described above, interact with an entity 110. The entity 110 can include systems, devices, parties such as users, and/or other features with which computing devices 102 and/or 104 can interact. For brevity, examples of entity 110 are discussed herein with reference to users of a computing system; however, these examples are not limiting. In an example, computing devices 102 operate computational models to determine an action to be taken in response to a user query, and transmit an indication of the action via network 108 to computing device 104(3), e.g., a smartphone. Computing device 104(3) takes the action, e.g., by presenting information. Computing device 104(3) then transmits information via network 108 to computing devices 102, e.g., information useful for determining result information. Computing devices 102 then determine a result value, update one or more of the computational models, and/or determine a new action. Examples of this process are discussed in more detail below with reference to FIGS. 4-12. In some examples, computing device 104 is operated by entity 110, e.g., a user.

Still referring to the example of FIG. 1, details of an example computing device 102(N) are illustrated at inset 112. The details of example computing device 102(3) can be representative of others of computing device(s) 102. However, each of the computing device(s) 102 can include additional or alternative hardware and/or software components. The illustrated computing device 102(N) can include one or more processing unit(s) 114 operably connected to one or more computer-readable media 116, e.g., memories, such as via a bus 118, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing units 114 can exchange data through an internal interface bus (e.g., PCIe), rather than and/or in addition to network 108. While the processing units 114 are described as residing on the computing device 102(N), in this example, the processing units 114 can also reside on different computing device(s) 102 and/or 104 in some examples. In some examples, at least two of the processing units 114 can reside on different computing device(s) 102 and/or 104. In such examples, multiple processing units 114 on the same computing device 102 and/or 104 can use a bus 118 of the computing device 102 and/or 104 to exchange data, while processing units 114 on different computing device(s) 102 and/or 104 can exchange data via network(s) 108.

Computer-readable media described herein, e.g., computer-readable media 116, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 116 can store instructions executable by the processing unit(s) 114, e.g., incorporated in computing device 102. Computer-readable media 116 can store, for example, computer-executable instructions of an operating system (omitted for brevity), module(s) of a representation engine 120, module(s) of a action engine 122, module(s) of a training engine 124, module(s) of a communications engine 126, and/or other modules, programs, and/or applications that are loadable and executable by processing unit(s) 114. For example, the computer-executable instructions stored on the computer-readable media 116 can upon execution configure a computer such as a computing device 102 and/or 104 to perform operations described herein with reference to the operating system, the representation engine 120, the action engine 122, the training engine 124, and/or the communications engine 126.

In some examples not shown, one or more of the processing unit(s) 114 in one of the computing device(s) 102 and/or 104 can be operably connected to computer-readable media 116 in a different one of the computing device(s) 102 and/or 104, e.g., via communications interface and network 108. For example, program code to perform steps of flow diagrams herein, e.g., as described herein with reference to action engine 122, can be downloaded from a server, e.g., computing device 102(1), to a client, e.g., computing device 104(K), e.g., via the network 108, and executed by one or more processing unit(s) in computing device 104(K).

Computer-readable media 116 can also store one or more computational model(s) 128, individually and/or collectively referred to herein with reference 128. In some examples, algorithms for training or operation of computational model(s) 128 as described herein can be performed on a computing device (e.g., computing device 102), such as a smart phone, a tablet, a desktop computer, a server, a server blade, a supercomputer, etc. The resulting models can be used on such computing devices and/or on computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 104 can operate an input layer of one or more neural network(s) and the computing device(s) 102 can operate a hidden layer of one or more neural network(s).

In various examples, e.g., of computational models trained for responding to user queries and/or other use cases noted herein, the computational models may include artificial neurons, e.g., interconnected to form a multilayer perceptron or other neural network. A neural network (NN) can have none, at least one, or at least two hidden layers. NNs having multiple hidden layers are referred to as deep neural networks (DNNs). In some examples, CMs 128 can include one or more recurrent computational models (RCMs). An RCM can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back via the memory cells. In some examples, an RCM can include one or more long short-term memory (LSTM) units, e.g., as discussed below with reference to FIG. 5. The computational model(s) 128 can include, e.g., one or more DNNs, RCMs such as recurrent neural networks (RNNs), deep RNNs (DRNNs), Q-learning networks (QNs) or deep Q-learning networks (DQNs), computational models such as those shown in FIG. 3, 5, or 10, and/or any combination thereof.

The computational models 128 can include, e.g., activation weights, functions, and/or thresholds (collectively "parameters") for artificial neurons and/or other computational units (e.g., LSTM units) of one or more neural networks. The training engine 124 can determine values of parameters in computational models 128. The representation engine 120 and/or the action engine 122 can use the determined parameters values of computational model 128 to, e.g., determine a response to a user query, and/or to perform other data analysis and/or processing. The communications engine 126 can communicate information, e.g., between entity 110 and computational models 128 designed for understanding user queries.

Training engine 124 can be configured to train CMs 128, e.g., to determine neuron parameters of artificial neurons in the CMs 128. For example, training engine 124 can train CMs 128 using a reinforcement-learning update rule. Training engine 124 can parallelize the training of the NNs across multiple processing units, e.g., cores of a multi-core processor and/or multiple general-purpose graphics processing units (GPGPUs). Accordingly, multiple layers of DNNs may be processed in parallel on the multiple processing units. Training engine 124 can train neural networks such as DNNs minibatch-based stochastic gradient descent (SGD). SGD can be parallelized along three dimensions, model parameters, layers, and data (and combinations thereof). Other frameworks besides SGD can be used, e.g., minibatch non-stochastic gradient descent and/or other mathematical-optimization techniques. Training engine 124 can train CMs 128 at least in part using an experience replay or "bag-of-transitions" reinforcement-learning update rule. In some examples, Training engine 124 can train CMs 128, e.g., including RCMs, using a reinforcement-learning update rule such as that discussed below with reference to FIG. 3.

Computing device 102 can also include one or more communications interface(s) 130 connected via the bus 118 to processing units 114 to enable wired and/or wireless communications between computing device(s) 102 and other networked computing devices 102 and/or 104 involved in cluster computing, and/or other computing device(s), e.g., over network(s) 108. The processing units 114 can exchange data through respective communications interface(s) 130, which can transmit and receive data via bus 118 or network 108. In some examples, the communications interface 130 can include, but is not limited to, a transceiver for cellular (3G, 4G, and/or other), WI-FI, Ultra-wideband (UWB), BLUETOOTH, and/or satellite transmissions. The communications interface 130 can include a wired I/O interface, such as an Ethernet interface, a serial interface, a Universal Serial Bus (USB) interface, an INFINIBAND interface, and/or other wired interfaces. The communications interface 130 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

In some examples, computing device 102 can include a user interface 132 configured to permit a user, e.g., entity 110 and/or a neural-network administrator, to operate the representation engine 120, the action engine 122, the training engine 124, and/or the communications engine 126. Some examples of user interface 132 are discussed below.

Details of an example computing device 104(1) are illustrated at inset 134. The details of example computing device 104(1) can be representative of others of computing device(s) 104. However, each of the computing device(s) 104 can include additional and/or alternative hardware and/or software components. Computing device 104(1) can include one or more processing unit(s) 136 operably connected to one or more computer-readable media 138, e.g., via a bus 140. Some examples of processing unit(s) 136 are discussed above with reference to processing unit(s) 114. Some examples of computer-readable media 138 are discussed above with reference to computer-readable media 116. For example, computer-readable media 138 can include one or more computer storage media. Some examples of bus 140 are discussed above with reference to bus 118.

Computer-readable media 138 can store, for example, computer-executable instructions of an operating system (omitted for brevity), a communications engine (omitted for brevity), a control program 142 and/or module(s) thereof, and/or other modules, programs, and/or applications that are loadable and executable by processing unit(s) 138.

In some examples, the control program 142 can be configured to receive inputs, e.g., via a keyboard, transmit corresponding queries to a computing device 102, receive responses from computing device 102, and present the responses, e.g., via a display. In some examples, training and operation of computational models are carried out on computing device(s) 102. In some examples, training and operation are carried out on a computing device 104. In some of these examples, the control program 142 can be configured to receive inputs, train and/or operate computational model(s) 128 using instructions of representation engine 120 and action engine 122 based at least in part on those inputs to determine an action, and implement the determined action. In some examples, the control program 142 can include a Web browser, smartphone app or desktop application, background service conducting or monitoring network communications, or instant-messaging client, or can include components of any of those configured to perform functions described herein. For clarity herein, various examples are discussed with reference to a Web browser. Other types of control programs 142 can be used with those examples except as expressly indicated.

In some examples, the computing device 104 can be configured to communicate with computing device(s) 102 to operate a neural network and/or other computational model 128. For example, the computing device 104 can transmit a request to computing device(s) 102 for an output of the computational model(s) 128, receive a response, and take action based on that response. For example, the computing device 104 can provide to entity 110 information included in the response.

Computing device 104 can also include one or more communications interfaces 144 connected via the bus 140 to processing unit(s) 136 to enable wired and/or wireless communications between computing device(s) 104 and other networked computing devices 102 and/or 104 involved in cluster computing, and/or other computing device(s), over network(s) 108. Some examples are discussed above with reference to communications interface 130.

In some examples, computing device 104 can include a user interface 146. For example, computing device 104(3) can provide user interface 146 to control and/or otherwise interact with cluster 106 and/or computing devices 102 therein. For example, processing unit(s) 136 can receive inputs of user actions via user interface 146 and transmit corresponding data via communications interface 144 to computing device(s) 102.

User interface 132 and/or 146 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 132 and/or user interface 146. In some examples, user interface 132 and/or user interface 146 can include a microphone 148 or other audio-input device, and computing device 104 can execute a speech-recognition engine (omitted for brevity) to determine, e.g., textual data of queries from input audio detected by microphone 148.

User interfaces 132 and/or 146 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like. Actions, e.g., presenting information of or corresponding to an output of a CM 128 to entity 110, can be taken via user interface 132 and/or user interface 146. In some examples, user interface 132 and/or user interface 146 can include a speaker 150 or other audio-output device, and computing device 104 can execute a speech-synthesis engine (omitted for brevity) to determine, e.g., audio data of actions from text or other data of those actions, e.g., received via network 108. Although shown as part of computing device 104, microphone 148 and speaker 150 can be separate from computing device 104 and communicatively connectable therewith.

Illustrative Components

Figure 2:
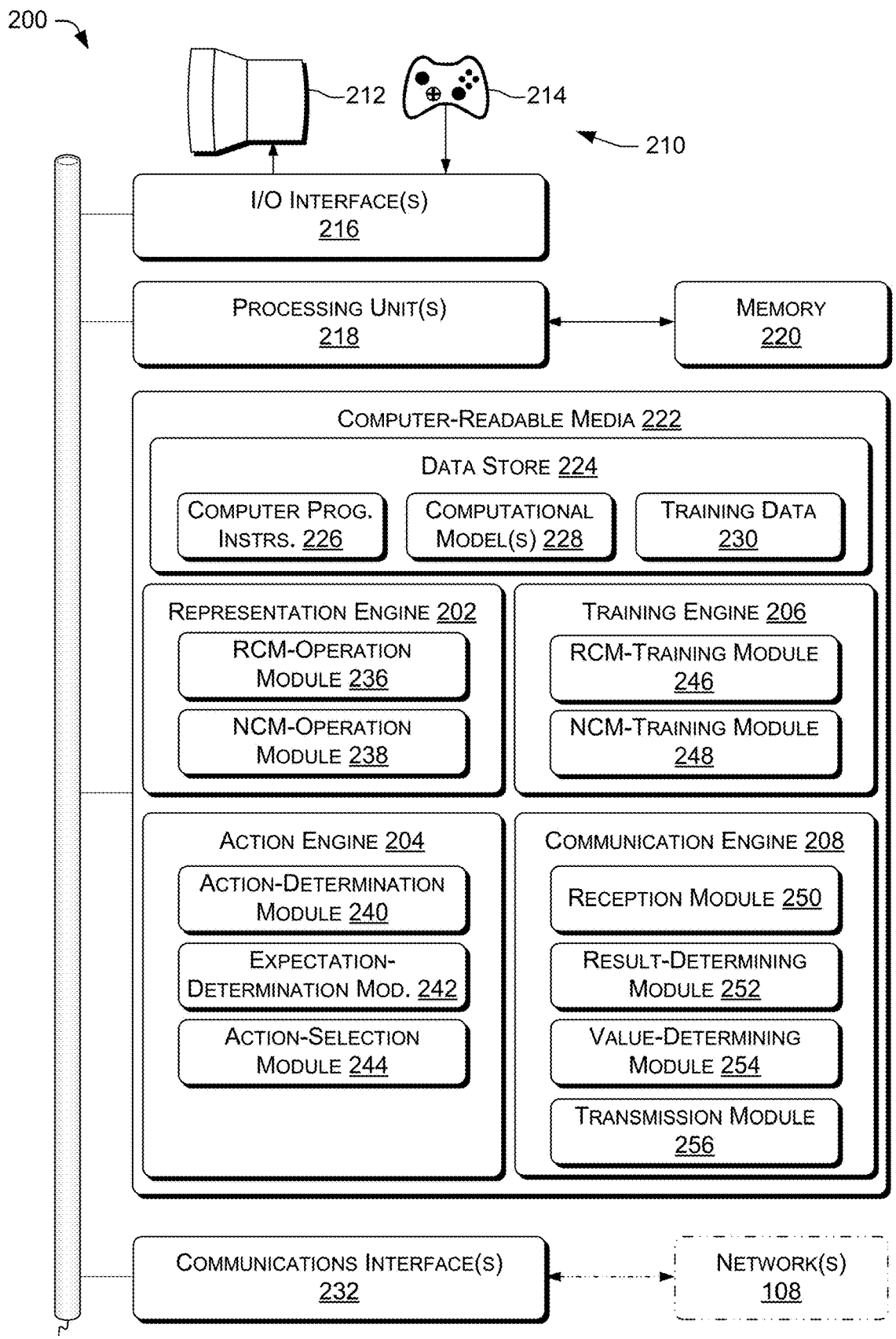
FIG. 2 is a block diagram depicting an example computing device configured to participate in training and operation of computational models according to various examples described herein.

FIG. 2 is an illustrative diagram that shows example components of an computing device 200, which can represent computing device(s) 102 and/or 104, and which can be and/or implement a computational-model training and/or operation system, device, and/or apparatus, according to various examples described herein. Computing device 200 can implement a representation engine 202, which can represent representation engine 120, FIG. 1. Computing device 200 can implement an action engine 204, which can represent action engine 122, FIG. 1. Computing device 200 can implement a training engine 206, which can represent training engine 124, FIG. 1. Computing device 200 can implement a communications engine 208, which can represent communications engine 126, FIG. 1. Computing device 200 can include and/or be included in a system and/or device for training and/or operating a neural network and/or other computational model as described herein.

Computing device 200 can include and/or be connected to a user interface 210, which can represent user interface 132 and/or 146. User interface 210 can include a display 212. Display 212 can include an organic light-emitting-diode (OLED) display, a liquid-crystal display (LCD), a cathode-ray tube (CRT), and/or another type of visual display. Display 212 can be a component of a touchscreen, and/or can include a touchscreen. User interface 210 can include various types of output devices described above with reference to user interface 132 and/or 146. In some examples, computing device 200 can be communicatively connected with a user interface 146, FIG. 1, of another computing device.

User interface 210 can include a user-operable input device 214 (graphically represented as a gamepad). User-operable input device 214 can include various types of input devices described above with reference to user interface 132 and/or 146.

Computing device 200 can further include one or more input/output (I/O) interface(s) 216 to allow computing device 200 to communicate with input, output, and/or I/O devices (for clarity, some not depicted). Examples of such devices can include components of user interface 210 such as user-operable input devices and output devices described above with reference to user interface 132 and/or 146. Other examples of such devices can include power meters, accelerometers, and other devices for measuring properties of entity 110, computing device 200, and/or another computing device 102 and/or 104. Computing device 200 can communicate via I/O interface 216 with suitable devices and/or using suitable electronic/software interaction methods. Input data, e.g., of user inputs on user-operable input device 214, can be received via I/O interface 216 (e.g., one or more I/O interface(s)). Output data, e.g., of user interface screens, can be provided via I/O interface 216 to display 212, e.g., for viewing by a user.

The computing device 200 can include one or more processing unit(s) 218, which can represent processing unit(s) 114 and/or 136. In some examples, processing unit(s) 218 can include and/or be connected to a memory 220, e.g., a RAM and/or cache. Processing units 218 can be operably coupled to the I/O interface 216 and to at least one computer-readable media 222, discussed below.

Processing unit(s) 218 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 218 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 218 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 218 of multiple types. For example, the processing units 218 in computing device 102(3) can be a combination of one or more GPGPUs and one or more FPGAs. Different processing units 218 can have different execution models, e.g., as is the case for graphics processing units (GPUs) and central processing unit (CPUs).

In some examples, computer-readable media 222 of the computing device 200 can represent computer-readable media 116 and/or 138, FIG. 1. Computer-readable media 116 can store instructions executable by processing unit(s) 218, and/or instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 200, while in some examples at least one processing unit 114, e.g., one or more of a CPU, GPU, and/or hardware logic device, can be external to computing device 200.

Computer-readable media 222, e.g., computer storage media, can store a plurality of modules of the representation engine 202, the action engine 204, the training engine 206, and/or the communications engine 208; examples are discussed below. Processing unit(s) 218 can be configured to execute modules of the plurality of modules. For example, the computer-executable instructions stored on the computer-readable media 222 can upon execution configure a computer such as a computing device 200 to perform operations described herein with reference to the modules of the plurality of modules. The modules stored in the computer-readable media 222 can include instructions that, when executed by the one or more processing units 218, cause the one or more processing units 218 to perform operations described below.

Computer-readable media 222 can also include an operating system (omitted for brevity). In some examples, an operating system is not used (commonly referred to as a "bare metal" configuration). In some examples, the operating system can include components that enable and/or direct the computing device 200 to receive data via various inputs (e.g., user controls, network and/or communications interfaces, memory devices, and/or sensors), and process the data using the processing unit(s) 218 to generate output. The operating system can further include one or more components that present the output (e.g., display an image on an electronic display, store data in memory, and/or transmit data to another computing device). The operating system can enable a user to interact with the computing device 200 using a user interface. Additionally, the operating system can include components that perform various functions generally associated with an operating system, e.g., storage management and internal-device management.

In the illustrated example, computer-readable media 222 includes a data store 224. In some examples, data store 224 can include data storage, structured and/or unstructured, such as a database (e.g., a Structured Query Language, SQL, and/or NoSQL database) and/or data warehouse. In some examples, data store 224 can include a corpus and/or a relational database with one or more tables, arrays, indices, stored procedures, and so forth to enable data access. Data store 224 can store data for the operations of processes, applications, components, and/or modules stored in computer-readable media 222 and/or computer instructions in those modules executed by processing unit(s) 218. In some examples, the data store can store computer program instructions 226 (e.g., instructions corresponding to processes described herein and/or to other software executable by processing unit(s) 218), one or more computational models 228, which can represent computational models 128, FIG. 1, training data 230, e.g., datasets, to be used for training and/or operation of the computational models 228, metadata, e.g., of datasets, database schema(s), and/or any combination thereof. In some examples, computational models 228 can include artificial neurons, as discussed below.

The computing device 200 can also include a communications interface 232, which can represent communications interface 130 and/or 144. For example, communications interface 232 (e.g., one or more communications interface(s)) can include a transceiver device such as a network interface controller (NIC) to send and receive communications over a network 108 (shown in phantom), e.g., as discussed above. As such, the computing device 200 can have network capabilities. Communications interface 232 can include any number of network, bus, and/or memory interfaces, in any combination, whether packaged together and/or separately. In some examples, communications interface 232 can include a memory bus internal to a particular computing device 102 or 104, transmitting via communications interface 232 can include storing the transmitted data in memory 220 or computer-readable media 222, and receiving via communications interface 232 can include retrieving data from memory 220 or computer-readable media 222.

For example, the computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, data aggregators, and/or data feeds, e.g., accessible via application programming interfaces (APIs). The processing units 218 can retrieve data from the data source(s), e.g., via a Hypertext Transfer Protocol (HTTP) request such as a GET to a Web Services and/or Representational State Transfer (REST) API endpoint.

In some examples, the processing unit(s) 218 can access the module(s) on the computer-readable media 222 via a bus 234, which can represent bus 118 and/or 140, FIG. 1. I/O interface 216 and communications interface 232 can also communicate with processing unit(s) 218 via bus 234.

The modules of the representation engine 202 stored on computer-readable media 222 can include one or more modules, e.g., shell modules and/or API modules (and likewise throughout the document), which are illustrated as a recurrent-computational-model (RCM)-operation module 236 and a network-computational-model (NCM)-operation module 238.

The modules of the action engine 204 stored on computer-readable media 222 can include one or more modules, which are illustrated as an action-determination module 240, an expectation-determination module 242, and an action-selection module 244.

The modules of the training engine 206 stored on computer-readable media 222 can include one or more modules, which are illustrated as an RCM-training module 246 and an NCM-training module 248

The modules of the communications engine 208 stored on computer-readable media 222 can include one or more modules, which are illustrated as a reception module 250, a result-determining module 252, a value-determining module 254, and a transmission module 256.

In the representation engine 202, the action engine 204, the training engine 206, and/or the communications engine 208, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the RCM-operation module 236 and the RCM-training module 246 can be combined in a single module that performs at least some of the example functions described below of those modules, and likewise the NCM-operation module 238 and the NCM-training module 248, and/or the NCM-operation module 238 and the action-selection module 244. In some examples, computer-readable media 222 can include a subset of the above-described modules.

Figure 3:
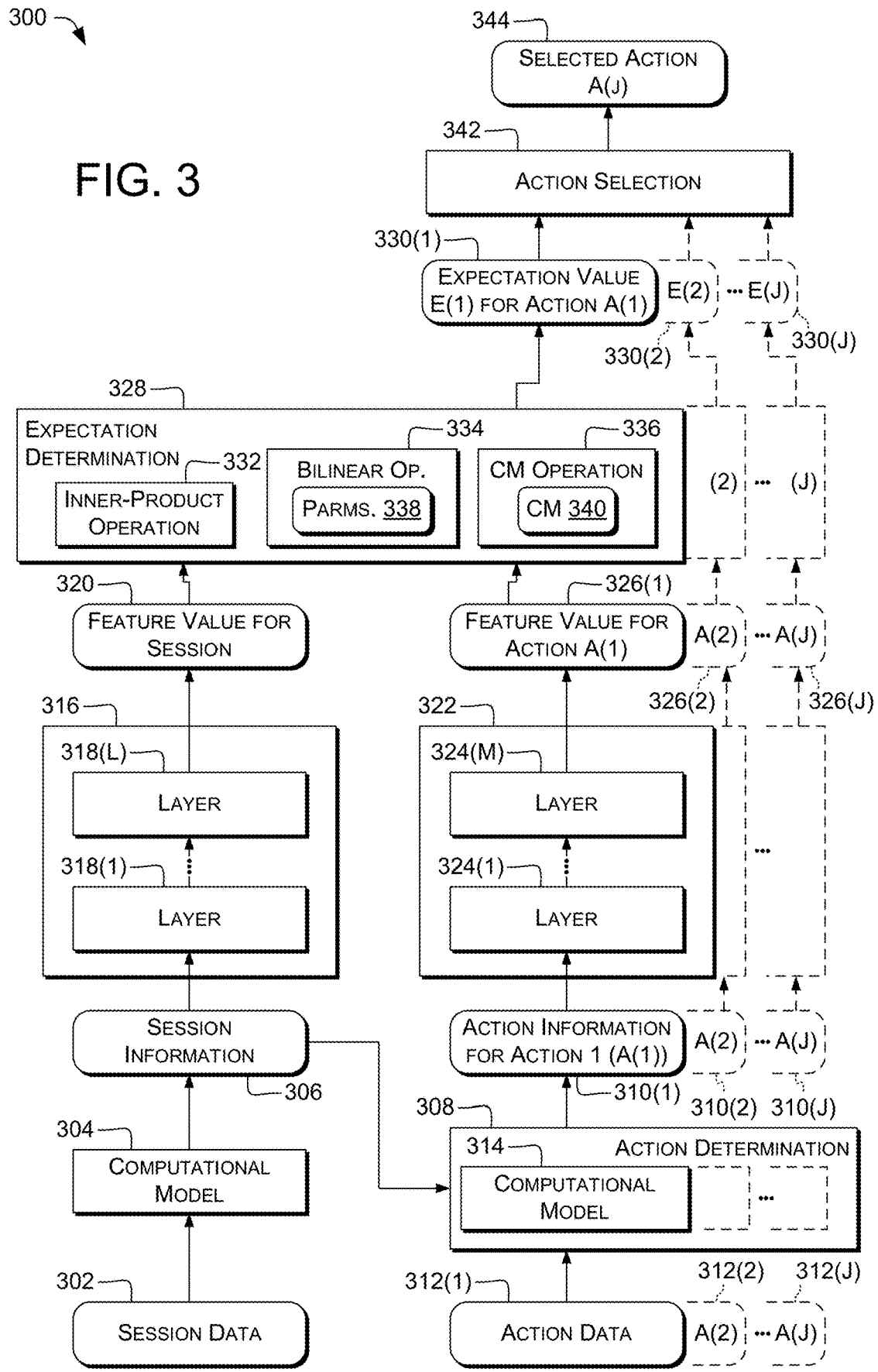
FIG. 3 is a representation of an example computational model.

FIG. 3 is a representation of an example computational model 300 and related dataflow. Data items are shown as rounded rectangles; computations or computational blocks are shown as square-cornered rectangles. In some examples, computational model 300 is operated at least one time over the course of a session, or using data related to a session.

A session can include, e.g., communications or interactions during a persistent network connection such as a Telnet connection, or a series of user interactions with a particular Web server or portal (e.g., across one or more HTTP connections). A session can be represented by a server such as computing device 102 with session data 302, e.g., stored in data store 224. Session data 302 can include at least one of: textual data of the session, e.g., a query or queries provided by entity 110 (including, but not limited to, text produced by a speech-recognition engine); text or timestamps of instant messages, text messages, social-network postings, or other communications transmitted to or from entity 110; identification information of a user or other entity 110, historical information of the session, e.g., prior queries, responses, or actions taken; content created by, sent to, or otherwise related to, entity 110; image data; audio data; numerical data such as number of queries in the session; user profile information such as name, location, interests, or the like; information about connections between entity 110 and other entities, e.g., other users; or date/time data such as start time of the session, historical times and dates of sessions by the same user, or a time zone or local time of entity 110. As used herein, a user profile can be associated with a particular entity 110, e.g., a user, or with a multiple users or a group of users. A particular entity 110 can be associated with one, at least one, or more than one user profile.

As used herein, a "timestamp" is a value that can represent a date, a time, or both, unless expressly stated otherwise. A duration between two timestamps, as used herein, is a duration between the times and dates represented by the two timestamps. For example, a duration between the two timestamps 3/14/15 9:26:53 and 3/15/15 00:00:00 is 14:33:07. Computational model 304, e.g., operated by NCM-operation module 238 or RCM-operation module 236, can determine session information 306 based at least in part on the session data 302. For example, CM 304 can include a DNN or an RCM. For brevity, some examples of CM 304 are discussed with reference to the nonlimiting example of an RCM. Session information 306 at timestep t can be denoted $s_t$.

In some examples, session information 306 can include textual information of the session, e.g., ASCII or UNICODE text. Session information 306 can include representations of textual information, e.g., a bag-of-words representation including counts for each of the unique words in the input. For example, the sentence "Buffalo Bill herds buffalo" can have the bag-of-words representation (bill:1, buffalo:2, herds:1). Session information 306 can include one or more one-hot vectors, each representing a particular word of the textual information. For example, given a dictionary containing words ("bill," "bison," "buffalo," "eats," and "herds"), the above sentence can be represented as the collection of vectors (0,0,1,0,0), (1,0,0,0,0), (0,0,0,0,1), (0,0,1,0,0), where a "1" in each vector signifies that that vector represents the word at the same position in the dictionary as the "1" in the vector. In some examples, session information 306 can include coordinates in a feature space, e.g., a 100-dimensional space, indicating, e.g., relative closeness of the session data 302 to predetermined features such as "buffalo" or "mimolette cheese."

Session information 306 can be provided to action determination block 308, e.g., implemented by action-determination module 240. Action determination block 308 can provide respective action information 310 for each of a plurality of actions I-J, as graphically represented by the dashed outlines throughout FIG. 3. For clarity of explanation, as used herein, a $j^{th}$ possible action is referred to as A(j), and action information 310(j) is respective action information 310 for A(j). FIG. 3 shows action information 310(1)-310(J) (individually and/or collectively referred to herein with reference 310) with J=3, but any number J≥1 can be used (1≤j≤J). Action information 310(j) at timestep t can be denoted $a_t^j$. The set of possible actions at timestep t can be denoted $\mathcal{A}_t$, so the number of such actions can be denoted $|\mathcal{A}_t|$.

In some examples, the plurality of actions can be at least partly predetermined, or action determination block 308 can include retrieving actions from data store 224 or other computer-readable media instead of or in addition to determining actions based on session information 306. In some examples, a knowledge base in data store 224 is used in determining actions. The knowledge base can include, for example, transactional information, e.g., information about recent purchases at a restaurant or other retail location. The transactional information can include information about what was purchased when and for what price. The transactional information can additionally or alternatively include information about products or services available for purchase, e.g., movie tickets or hotel rooms. The transactional information can include information about what products or services are available, at what times or in what time ranges, for what price or in what price ranges. The knowledge base can additionally or alternatively include information about coupons or other discounts or promotions applicable, e.g., to entity 110. The knowledge base can be updated, e.g., by aggregating or filtering results from queries to databases, e.g., queries via Web Services or other APIs. For brevity, references below to queries of the knowledge base also represent the possibility of queries directly to other databases, e.g., a retailer's database of real-time product availability information.

In some examples, the knowledge base can include a plurality of possible responses to the user's query, e.g., possible answers to a user's question or resources, such as hyperlinks, that may be relevant to the user's query. The possible responses can be selected, e.g., using a full-text search algorithm, keyword filtering, or other search technique(s), in some examples. For example, APACHE LUCENE or another full-text search engine can be provided the query and the knowledge base, and can return an indication of which members of the knowledge base are possible responses. In some examples, possible responses can be selected, filtered, or ranked based at least in part on transactional information, discount information, or other information stored in the knowledge base. For clarity of explanation, "output(x)" as used herein is a function that presents information x to entity 110. Function "linkto(x)" transmits information indicating that entity 110 should retrieve a resource addressed by hyperlink x. For example, linkto(x) can transmit an HTTP 307 Temporary Redirect status code including hyperlink x as the value of a "Location" header. Function "results( )" transmits a list of search results to entity 110.

For example, given the user query "who is the president of washington university," e.g., from entity 110, possible responses may include the answers "Ana Mari Cauce" (the president of WU installed in October 2015) or "George Washington", or the hyperlinks "http://www.washington.edu/president" or "http://president.gwu.edu". Each possible response can correspond with a particular action A(j). An additional action can include presenting the list of possible responses, e.g., in the form of a search results page. In this example, therefore, J=5, A(1)=output("Ana Mari Cauce"), A(2)=output("George Washington"), A(3)=linkto("http://www.washington.edu/president"), A(4)=linkto("http://president.gwu.edu/"), and A(5)=results( ).

In another nonlimiting example, a query from entity 110 can include text "the martian movie" or other text corresponding to a movie or other event. In some examples, the query can be associated with entity 110, e.g., a user. Action determination block 308 can include invoking, operating, or communicating with a search service (omitted for brevity), e.g., a LUCENE engine as noted above, that searches over the knowledge base in data store 224. Action determination block 308 can include determining action information 310(j) based at least in part on a jth search result from the search service. For example, the search results can include (1) showtimes for a nearby movie theater (e.g., "3:10 PM/6:30 PM/9:50 PM"), (2) a list of cast members (e.g., "Starring Matt Damon, Jessica Chastain, and eight others"), (3) ratings for the movie (e.g., "8.1/10 with four stars"), (4) a link to a ticket-purchasing Web site ("https://tickets.example.com"), or (5) links to possibly-relevant Web sites, e.g., Wikipedia (https://en.wikipedia.org/wiki/The_Martian_(film)) or IMDB (http://www.imdb.com/title/tt3659388). In an example in which J=6,
A(1)=output("Showtimes: 3:10 PM/6:30 PM/9:50 PM"),
A(2)=output("Cast: Starring Matt Damon, Jessica Chastain, and eight others"),
A(3)=output("Rating: 8.1/10 with four stars"), A(4)=linkto("http://tickets.example.com"),
A(5)=output("Tickets can be purchased at https://tickets.example.com"), and A(6)=results( ). In this example, action determination block 308 determines two possible actions based on the fourth search result: A(4), to link directly to the ticket-purchasing site, and A(5), to present the Uniform Resource Locator (URL) of the ticket-purchasing site for the consideration of entity 110.

In still another nonlimiting example of a query "the martian movie", possible responses can include (1) a link to a first ticket-purchasing Web site ("https://tickets.example.com"), or (2) a link to a second ticket-purchasing Web site ("https://purchase.example.net"). Action determination block 308 can query the knowledge base to determine whether or not each of these Web sites has tickets available for showtimes within the next week or within a timeframe specified in session information 306 (e.g., stored data of user preferences). If the second ticket-purchasing Web site has tickets available, but the first ticket-purchasing Web site does not have tickets available (e.g., as determined by querying the knowledge base), action determining block 308 can exclude linkto("https://tickets.example.com") from any action information 310(j), but include linkto("https://purchase.example.net") in action information 310, e.g., as information 310(1). Action determining block 308 can use action information 310(1) as the only action information (J=1) or, alternatively, can determine additional actions (J>1) and corresponding action information 310(j).

In yet another nonlimiting example, in response to a query for "space movie," possible responses can include (1) linkto ("http://www.imdb.com/title/tt0079936/"), a link to the IMDB page for "The Space Movie" by Tony Palmer and Mike Oldfield; (2) output("we recommend The Martian"), a recommendation for a specific movie; or a Web link for a list of space-related movies, e.g., linkto("https://en.wikipedia.org/wiki/List_of_films_about_outer_space").

In still another nonlimiting example, in response to a query for "musicians," possible responses can include at least one of links to musicians' Web sites, links to record labels' Web sites, or suggestions of a person to follow on TWITTER or another social media site, e.g., @GordenMikefield for Mike Oldfield's account on TWITTER.

In still another nonlimiting example of a help or technical-support system, individual items of action information 310 can include possible steps toward resolution of a user's problem, e.g., with the user's computing device 104. The session information 306 can include information about the user's computing environment or other system in or with which the user is having a problem, e.g. operating-system version or installed code libraries. The query 402 or other session information 306 can include a description of the problem, e.g., a description provided by the user as text. Actions specified by action information 310 can include, but are not limited to: querying the system for further information (e.g., CPU usage or available disk space), running an automated diagnostic procedure, running a wizard or other interactive diagnostic procedure, providing suggested problem-resolution steps to the user, or providing contact information the user can use to contact relevant technical support personnel or services.

In some examples, action data 312(j) of one or more actions A(j) can be used in determining the action information 310(j). In some examples, action data 312 can be included in or based at least in part on session information 306. For example, session information 306 can include textual action data 312.

In some examples, action determination block 308 can include or operate computational model 314, e.g., operated by NCM-operation module 238 or RCM-operation module 236. For example, CM 314 can include a DNN or an RCM. For brevity, some examples of CM 314 are discussed with reference to the nonlimiting example of an RCM. CM 314 can determine action information 310(j) for action A(j) based at least in part on at least one of the session information 306 or action data 312(j) of action A(j). In some examples, CM 314 can determine action information 310(j) for action A(j) based at least in part on textual data 312(j) of action A(j). As indicated by the dashed outlines, in some examples, a single CM 314 can be operated J times to determine action information 310(j) for each of the J actions. Any number of times of operation of any number of CMs 314 can be used in determining action information 310 (e.g., J CMs 314 operated in parallel, with one action each, or two CMs 314, each operated J/2 times).

In some examples, action determination block 308 can include operating computational model 314 using action data 312 as input to provide action information 310 as output. Action data 312 can include data of any of the types listed above for session data 302. In some examples, action determination block 308 can include determining a representation of the action data 312(j), the representation being included in action information 310(j). For example, action determination block 308 can perform at least one of the following: count words in action data 312(j) to determine a bag-of-words representation; produce one-hot vectors for words in action data 312(j) to determine a one-hot-vector-sequence representation; or multiply a bag-of-words or other vector representation of (or in) action data 312 by a transformation matrix or tensor to determine a vector, matrix, or tensor representation. Action information 310 can include, or be determined based at least in part on, values in any of the representations described above with reference to session information 306.

In some examples, at least one of the session information 306 or the action information 310 can include data of any of the types described above, e.g., bag-of-words, one-hot, textual, or other data. In some examples, at least one of the session information 306 or the action information 310 can include or consist of a vector of numeric values, e.g., real or complex values. Such a vector is referred to herein as an "embedding vector." In some examples, the session information 306 and the action information 310 can include or consist of respective embedding vectors. The respective embedding vectors can have the same dimensions (e.g., 100×1) or can have different dimensions.

Session information 306 can be provided to NCM 316 including at least one layer 318 of artificial neurons. NCM 316 is referred to herein as a "session NCM." The illustrated example shows layers 318(1)-318(L) (individually and/or collectively referred to herein with reference 318), but any integer L≥1 can be used. NCM 316 can produce, e.g., as the output of layer 318(L), a first feature value 320 corresponding to the session. The first feature value 320 can include, e.g., a vector of the output values of artificial neurons in layer 318(L). In some examples, the vector (first feature value 320) can have 100 elements. NCM 316 can operate as set forth in Eqs. (1) and (2), in which $h_{l,s}$ denotes the lth layer for session NCM 316 (implicitly operated at timestep t) and $W_{l,s}$ denotes the weight matrix and $b_{l,s}$ the bias vector between layer l-1 and layer l(l∈[1, L]).

$$h_{1,s} = f(W_{1,s}s_t + b_{1,s}) \quad (1)$$

$$h_{l,s} = f(W_{l-1,s}h_{l-1,s} + b_{l-1,s}), l=2,3,\ldots,L \quad (2)$$

Action information 310 can be provided to NCM 322 including layers 324(1)-324(M) (individually and/or collectively referred to herein with reference 324), for integer M≥1. NCM 316 is referred to herein as an "action NCM." NCM 322 can produce, e.g., as the output of layer 324(L), a respective second feature value 326(1) corresponding to the action information 310(1). The second feature value 326(1) can include, e.g., a vector of the output values of artificial neurons in layer 324(L). In some examples, the vector (first feature value 320) can have 100 elements. As represented by the dashed outline and arrows, NCM 322 can be operated multiple times to determine the respective second feature values 326(2)-326(J) based on action information 310(2), . . . , 310(J) (second feature values 326(1)-326(J) are individually and/or collectively referred to herein with reference 326). Additionally or alternatively, multiple computational models having parameters in common with (e.g., having the same parameters as) NCM 322 can be operated to determine respective second feature values 326. In some examples, each of multiple CMs 322 is operated multiple times to produce multiple second feature values 326. NCM 322 can operate as set forth in Eqs. (3) and (4), in which $h_{l,a}$ denotes the lth layer for action NCM 322 (implicitly operated at timestep t) and $W_{l,a}$ denotes the weight matrix and $b_{l,a}$ the bias vector between layer l-1 and layer l(l∈[1,M]). In some examples, L=M; in other examples, L>M or L<M.

$$h^i_{1,a} = f(W_{1,a}a^i_t + b_{1,a}), i=1,2,3,\ldots,|\mathcal{A}_t| \quad (3)$$

$$h^i_{l,a} = f(W_{l-1,a}h^i_{l-1,a} + b_{l-1,a}), i=1,2,3,\ldots,|\mathcal{A}_t|, l=2,3,\ldots,M \quad (4)$$

The first feature value 320 corresponding to the session and the second feature value 326(1), which corresponds to the action associated with action information 310(1), can be provided to expectation determination block 328, e.g., implemented by expectation-determination module 242. Expectation determination block 328 can determine an expectation value 330(1) (denoted E(1)) for action A(1). Similarly, as denoted by the dashed-line "(2)" through "(J)" boxes, expectation determination block 328 can determine expectation value 330(j) (E(j)) for action A(j), for j=2 to J. Illustrated are expectation values 330(2) (E(2)) and 330(J) (E(J)). Expectation determination block 328 can determine expectation value 330(j) based at least in part on first feature value 320 of the session and the respective second feature value 326(j) for action A(j). An individual expectation value 330(j) can include, e.g., a scalar, vector, matrix, or tensor. As used herein, the notations A(j) and E(j) are implicitly with respect to a particular timestep t.

In Eqs. (1)-(4) and other Eqs. herein as noted, f(·) denotes the activation function of an artificial neuron. Activation functions can include, e.g., softmax, hyperbolic tangent (tan h), logistic, sigmoid, zero-clip, rectifier, softplus, and/or other functions. In some examples, the activation function set forth in Eq. (5) is used.

$$f(x) = \tanh(x) = \frac{1 - \exp(-2x)}{1 + \exp(-2x)} \quad (5)$$

Expectation determination block 328 can determine each expectation value 330(j) using one of the below-described techniques or operations, or a combination (e.g., an average or sum) of more than one of the below-described techniques or operations. Example operations can include, but are not limited to, an inner-product operation 332, a bilinear operation 334, and a computational-model operation 336.

In some examples, expectation determination block 328 can perform inner-product operation 332 including computing a inner product (e.g., a dot product) of a vector first feature value 320 with an equal-length vector second feature value 326(j) to provide scalar expectation value 330(j) (denoted E(j)) for action A(j). The inner product can be carried out as in Eq. (6).

$$E(i) \text{ at timestep } t = E(s_t, a^i_t) = h^i_{L,s} h^i_{L,a} \quad (6)$$

In some examples, expectation determination block 328 can include determining expectation value 330(j) using bilinear operation 334 having parameters 338. An example is shown in Eq. (7):

$$E(j) \text{ at timestep } t = h^T_{L,s} B h^i_{L,a} \quad (7)$$

where $h_{L,s}$ is the feature value 320 of the session, $h^i_{L,a}$ is the feature value 326(j) of action A(j), and B is a bilinear-interpolation matrix (a parameter 338) having dimensions selected so that E(j) can be computed as in Eq. (7). In an example in which $h_{L,s}$ and $h^i_{L,a}$ have the same dimensions and B is the identity matrix, the bilinear operation 334 reduces to the inner-product operation 332.

In some examples, expectation determination block 328 can perform computational-model operation 336 including determining expectation value 330(j) by operating a computational model 340 having as input feature value 320 of the session and feature value 326(j) of action A(j), and providing as output expectation value 330(j) (E(j)). In some examples, CM 340 can include a neural network, e.g., a deep neural network, having neuron parameters. In some examples, the input to CM 340 can include a concatenation of a vector feature value 320 of the session and a vector feature value 326(j). Some examples of computational-model operation 336 and CM 340 are discussed below with reference to FIGS. 10-12.

Expectation values 330(j) for at least some of the actions A(1)-A(J) can then be provided to action selection block 342, e.g., implemented by action-selection module 244. Action selection block 342 can select one of the actions based at least in part on the expectation values 330. In some examples, action selection block 342 can select the action 344 A(j) having the highest expectation value 330(j) (E(j)).

Continuing with the example notation introduced above in the context of purchasing movie tickets, in some examples, session information 306 can indicate a time period of preferred showtimes. The time period can be determined by general user preferences, e.g., "not before 5 pm," or can be determined by the query, e.g., later on the same day for a query such as "martian movie tonight," or any combination thereof.

If a first ticket-purchasing Web site (tickets.example.com) does not have tickets available within the time period and a second ticket-purchasing Web site (purchase.example.net) does have tickets available within a selected time period, e.g., as indicated by information in the knowledge base, action determining block 308 can include both linkto ("https://tickets.example.com") and linkto("https://purchase.example.net") in action information 310 (e.g., as information 310($j_1$) and information 310($j_2$) respectively). In some examples, action determining block 308 can include in action information 310($j_1$) an indication that tickets are not available within the time period, or can include in action information 310(2) an indication that tickets are available within the time period. Additionally or alternatively, action determining block 308 can include in action information 310($j_x$) an indication of when tickets are available for a ticket-purchasing outlet corresponding to A($j_x$).

Since session information 306 includes information about a time period for preferred showtimes, in this example, and information 310($j_x$) of at least one action A($j_x$) (or all of the actions) includes information about showtimes available via action A($j_x$), expectation values 330(j) can be higher for an action A($j_2$) that has available showtimes within the time period than for an action A($j_1$) that does not have available showtimes within the time period. This can permit action selection block 342 to select action A($j_2$) instead of action A($j_1$), and permit transmission module 256 to provide entity 110 with an indication of action A($j_2$), e.g., linkto("https://purchase.example.net"). This can reduce the network bandwidth and time required for the user (entity 110) to order tickets, since the action taken by the system directs the user to a site already determined to have tickets available (to the degree of certainty permitted by the information in the knowledge base).

In some examples, computational models 304, 314, 316, or 322 can include one or more neural networks. In the illustrated example, computational models 304 and 314 include respective recurrent neural networks, and computational models 316 and 322 include respective multilayer perceptrons. Each of the computational models 304, 314, 316, or 322 can include a single layer of artificial neurons, or can include one or more input layers, zero or more hidden layers, and one or more output layers of artificial neurons. In some examples, one or more of the illustrated computational models or herein-described layers or sets of layers can be combined into combination neural networks, layers, and/or sets of layers. As used herein, the term "neural network" encompasses connected, independently-operable subnetworks of a larger neural network. Computational models can include neural networks. Computational models can additional include other elements, such as expectation determination block 328, which can compute a inner product as described above, or an LSTM unit, as described below with reference to FIG. 5.

In the illustrated example, operating a computational model of the computational models 304, 314, 316, or 322 can include transforming corresponding input values according to parameters of the artificial neurons. In some examples, layers of the illustrated CMs, or artificial neurons thereon, can be configured to apply nonlinear transformation(s) to input data values.

In some examples, one or more of the computational models (e.g., computational models 304 and 314) can include a recurrent computational model (RCM). In an RCM, output values of layer(s) or element(s) thereof can be provided as inputs to the same or other layer(s) or element(s) in the RCM. For example, outputs of artificial neurons in a hidden layer can be provided as inputs to artificial neurons of an input layer, e.g., at a later time step. In another example, the value provided by a memory in an LSTM can be provided as input to the memory, subject to control of a forget gate as described below. RCM configurations permit maintaining history in the computational models, so that output values of the computational models can represent, e.g., complex relationships between inputs and outputs over multiple time periods. In an example, each of computational models 304 and 314 receives textual input, e.g., one word at a time. Using an RCM in computational models 304 and 314 can permit processing the textual input based on the order in which it occurs, e.g., to distinguish "Bob ate it" from "it ate Bob."

In some examples, the vector output $h_t$ of a layer t of artificial neurons can be expressed as in Eq. (8):

$$h_t = f(W \cdot h_{t-1} + V \cdot x_t) \tag{8}$$

where f represents activation function(s) of the neurons in the layer. Also in Eq. (8), $x_t$ represents, e.g., the inputs at time period t and/or value(s) produced by an input layer, V represents weighting factor(s) on the value(s) produced by input layers such as layer 318(1) or layer 324(1), and W represents weighting factor(s) on the value(s) produced by layer t−1 and provided to layer t. In some examples, the term $V \cdot x_t$ in Eq. (8) can be replaced by a constant bias b, as in Eq. (9).

$$h_t = f(W \cdot h_{t-1} + b) \tag{9}$$

In some examples, $h_{t-1}$ can be replaced by inputs $x_{t-1}$ or other computational-model inputs.

In some examples, NCM-operation module 238 or RCM-operation module 236 can include operating at least one of computational models 304, 314, 316, or 322 as described herein. Operating a computational model can include determining inputs and parameters of a first layer or initial element(s) of that computational model, and applying the relevant data transformations for layer(s) or element(s) of the computational model. For example, in a computational model including artificial neurons, NCM-operation module 238 or RCM-operation module 236 can determine the W and b parameters of artificial neurons in a first layer (e.g., layer 318(1) or layer 324(1)), e.g., by retrieving the parameters from data store 224 or other storage in a processor-accessible memory. The module 238 or 236 can then compute the result of, e.g., Eq. (9) for each artificial neuron, using the corresponding W and b parameters of that artificial neuron, and using the inputs of that artificial neuron in place of $h_{t-1}$. In computational models including an LSTM unit, the module 238 or 236 can compute the results of Eqs. (23)-(28). In multilayered computational models, the module 238 or 236 can provide the outputs of one layer as inputs of a subsequent layer, and compute the outputs of the subsequent layer, e.g., using Eqs. (8), (9), (23)-(28), or other equations corresponding to the types of elements in the layer.

Parameters of computational models 304, 314, 316, or 322 can be adjusted in a training process using backpropagation and/or other training algorithms for recursive neural networks. The RCM-training module 246 or the NCM-training module 248 can, e.g., adjust at least one of parameters, e.g., neuron parameters, of layer(s) or unit(s) of computational models 304, 314, 316, or 322, or parameters of expectation determination block 328. The RCM-training module 246 or the NCM-training module 248 can train the computational models 304, 314, 316, or 322 using a backpropagation training algorithm, e.g., in an SGD framework. Training of computational models 304, 314, 316, or 322 can include modifying the parameters of those networks in place, or providing new networks having the updated parameters. Descriptions of either configuration in this document include the other configuration, except as expressly noted herein.

One or more of the computational models 304, 314, 316, or 322 can be trained using a reinforcement-learning algorithm, e.g., based on the Bellman Equation, e.g., in an SGD framework. For example, an expectation value 330 output by a computational model can be compared to a result value received via communications interface 232, as discussed below with reference to FIG. 4. The parameters of one or more of the computational models 304, 314, 316, and 322, or parameters 338 or neuron parameters of CM 340, can be updated by RCM-training module 246 or NCM-training module 248 based on the result of the comparison. In some examples, the RCM-training module 246 or the NCM-training module 248 can additionally or alternatively train or otherwise adjust parameters of expectation determination block 328, e.g., parameters 338 of bilinear operation 334 or neuron parameters of CM 340 of CM operation 336.

In some examples, the expectation determination block 328 uses an inner-product operation 332, e.g., per Eq. (6). The NCM-training module 248 cooperatively trains computational models 316 and 322 using a reinforcement-learning update rule. Notation is set forth in Eqs. (10)-(12), which $s_t$ is the session information 306 at timestep t, $a_t$ is the selected action 344, $r_t$ is a result value after taking the selected action 344 (e.g., result value 418, FIG. 4), and $s_{t+1}$ is session information 306 at timestep t+1. The session information 306 $s_{t+1}$ is available during training, e.g., in a minibatch or experience-replay configuration in which actions are taken and corresponding session information and result values recorded for later training, as discussed below with reference to Table 1.

Gradients can be determined using the quantities in Eqs. (10)-(12).

$$\Delta = \frac{\left[E(s_t, a_t) - \left(r_t + \gamma \max_a E(s_{t+1}, a)\right)\right]^2}{2} \quad (10)$$

$$\delta_{l,s} = \delta b_{l,s} = \frac{\partial E}{\partial b_{l,s}} \quad (11)$$

$$\delta_{l,a} = \delta b_{l,a} = \frac{\partial E}{\partial b_{l,a}} \quad (12)$$

Using the notation in Eqs. (10)-(12), a gradient can be established as in Eq. (13):

$$\delta E = \frac{\partial \Delta}{\partial E} = E(s_t, a_t) - \left(r_t + \gamma \max_a E(s_{t+1}, a)\right) \quad (13)$$

Updates to the weight and bias matrices of CMs 316 and 322 can then be determined as set forth in Eqs. (14)-(17), in which ⊙ represents an element-wise Hadamard product.

$$\begin{cases} \delta_{L,s} = \delta E \cdot h_{L,a} \odot (1 - h_{L,s}) \odot (1 + h_{L,s}) \\ \delta_{l-1,s} = W_{L,s}^T \delta_{l,s} \odot (1 - h_{l-1,s}) \odot (1 + h_{l-1,s}), \quad l = 2, 3, \ldots, L \end{cases} \quad (14)$$

$$\begin{cases} \delta_{L,a} = \delta E \cdot h_{L,s} \odot (1 - h_{L,a}) \odot (1 + h_{L,a}) \\ \delta_{l-1,a} = W_{l,a}^T \delta_{l,a} \odot (1 - h_{l-1,a}) \odot (1 + h_{l-1,a}), \quad l = 2, 3, \ldots, M \end{cases} \quad (15)$$

$$\begin{cases} \delta W_{1,s} = \frac{\partial E}{\partial W_{1,s}} = \delta_{1,s} \cdot s_t^T \\ \delta W_{l,s} = \frac{\partial E}{\partial W_{l,s}} = \delta_{l,s} \cdot h_{l-1,s}^T, \quad l = 2, 3, \ldots, L \end{cases} \quad (16)$$

$$\begin{cases} \delta W_{1,a} = \frac{\partial E}{\partial W_{1,a}} = \delta_{1,a} \cdot a_t^T \\ \delta W_{l,a} = \frac{\partial E}{\partial W_{l,a}} = \delta_{l,a} \cdot h_{l-1,a}^T, \quad l = 2, 3, \ldots, M \end{cases} \quad (17)$$

A temporal difference error can be computed per Eq. (18), for network parameters $\Theta_{k-1}$ at timestep k−1.

$$d_k = r_k + \gamma \cdot \max_a E(s_{k+1}, a; \Theta_{k-1}) - E(s_k, a_k; \Theta_{k-1}) \quad (18)$$

The weights and biases can then be updated per Eqs. (19)-(22).

$$W_{s,k} = W_{s,k-1} + \eta_k d_k \cdot \frac{\partial E(s_k, a_k; \Theta_{k-1})}{\partial W_s} \quad (19)$$

$$b_{s,k} = b_{s,k-1} + \eta_k d_k \cdot \frac{\partial E(s_k, a_k; \Theta_{k-1})}{\partial b_s} \quad (20)$$

$$W_{a,k} = W_{a,k-1} + \eta_k d_k \cdot \frac{\partial E(s_k, a_k; \Theta_{k-1})}{\partial W_a} \quad (21)$$

$$b_{a,k} = b_{a,k-1} + \eta_k d_k \cdot \frac{\partial E(s_k, a_k; \Theta_{k-1})}{\partial b_a} \quad (22)$$

Due to the inner-product operation 332, the session CM 316 and the action CM 322 are linked. Accordingly, during backpropagation, in Eq. (14), the update $\delta_{L,s}$ to session CM 316 is determined based in part on outputs $h_{L,a}$ from the action NCM 322. Similarly, the update $\delta_{L,a}$ to the action CM 322 is determined based in part on outputs $h_{L,s}$ from the session CM 316.

Figure 5:
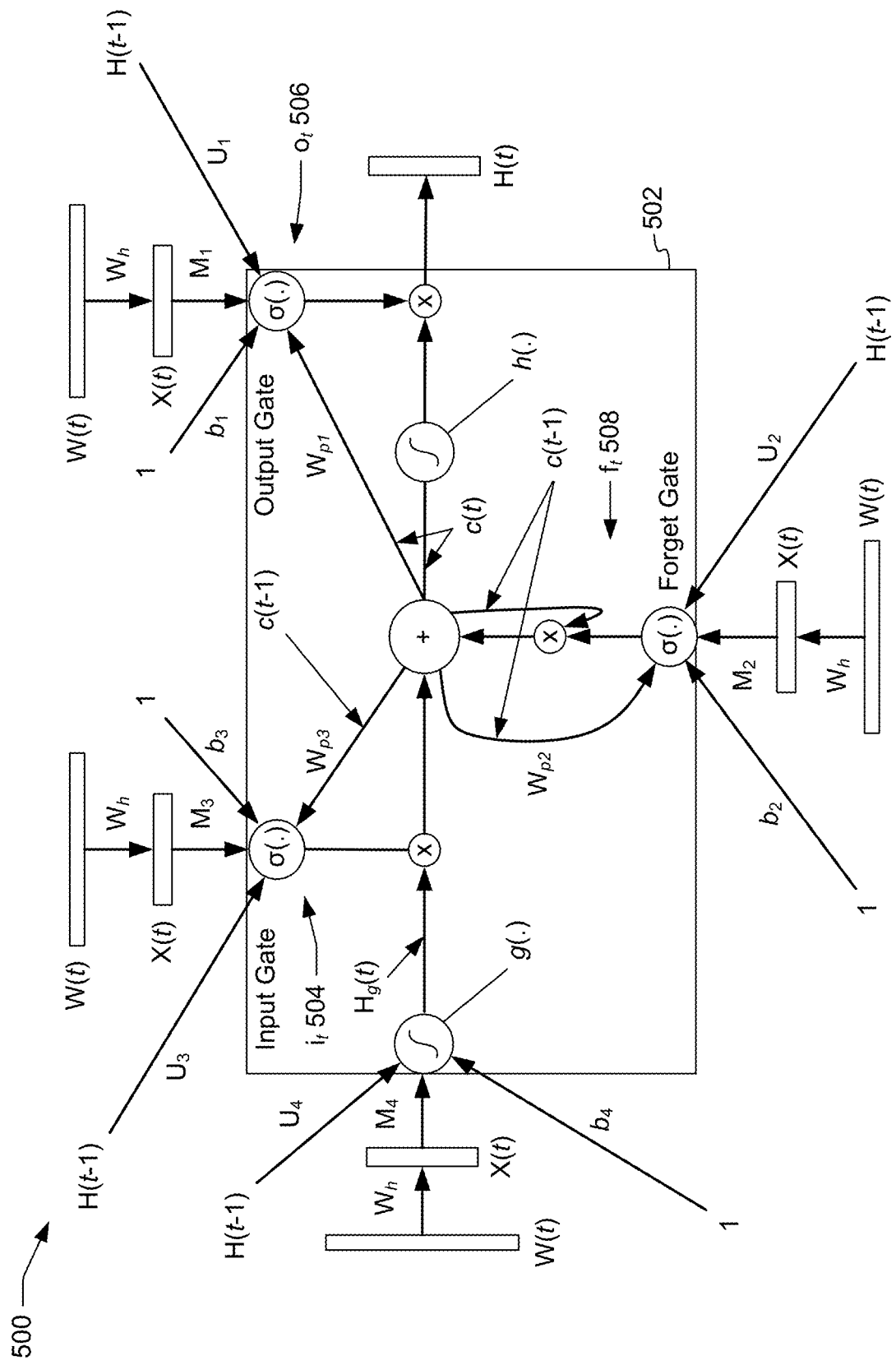
FIG. 5 is a dataflow diagram depicting an example architecture of a long short term memory cell that can be used in neural networks according to various examples described herein.

In some examples, the RCM-training module 246 or the NCM-training module 248 can cooperatively train expectation determination block 328 and CMs 304, 314, 316, and 322 to determine, for example: parameters used in expectation determination block 328, neuron parameters of CM 322; neuron parameters of CM 316; and parameters of CMs 304 and 314 (e.g., LSTM parameters as described herein with reference to FIG. 5). Cooperative end-to-end training of these models, e.g., using minibatch-based stochastic gradient descent with gradients determined by a rule such as a reinforcement-learning update rule, can permit more effectively modeling the session and more effectively responding to queries from entity 110. This can reduce the amount of bandwidth required to conduct the session with entity 110.

In some examples, at least one of CM 304, CM 314, and CM 340 can be trained in advance of operation of the system. In these examples, RCM-training module 246 or NCM-training module 248 can leave unchanged the parameters of ones of those models that have been trained in advance. This can reduce training time by reducing the number of parameters to be trained.

In some examples, each expectation value 330 can represent the combination of an expected reference result value in response to a respective action with subsequent reference result values expected after taking that action. Therefore, expectation value 330(j) can represent the expected long-term result ("reward") of, resulting from, or corresponding to, a particular short-term action A(j). Training one or more of the computational models 304, 314, 316, and 322 using reinforcement learning can cause the computational models to jointly, with increasing accuracy as training proceeds, model those long-term results. This can permit selecting short-term actions based on long-term results in addition to and/or instead of short-term results. For example, in responding to a query from entity 110, choosing a response based on a long-term history of interactions with entity 110 can permit choosing, with higher probability than in a short-term view, an action that will respond effectively to the query.

In some examples, as described herein, a common set of parameters of CM 322 is used in determining the feature values 326(j) for each action A(j). For example, the same artificial-neuron weights and biases can be used in determining feature values 326(j) for all j∈[1,J]. Similarly, in some examples, other computational-model parameters, such as LSTM parameters discussed below with reference to FIG. 5, can be used in determining each of the feature values 326(j) for all j∈[1,J]. Using common parameters can permit more effectively representing the space of actions, e.g., in a way effectively comparable to or combinable with the session feature value 320. Moreover, using common parameters can reduce the time, power, and memory required for computational-model training, since only one set of parameters needs to be determined instead of J sets of parameters. Furthermore, using a common set of parameters permits evaluating any number J of actions, rather than a number of actions up to a fixed maximum as in some prior schemes. In some examples, a first common set of parameters is used for a first timestep, and a second common set of parameters is used for a second, different timestep. In some examples, each timestep corresponds to a unique common set of parameters. In some examples, at least two timesteps use a particular common set of parameters.

Some examples use separate CMs 316 and 322 to evaluate the session (state) and the possible action(s), respectively. Using separate CMs can reduce the complexity, and thus training time, of each CM. Moreover, using separate CMs can permit each CM 316, 322 to independently determine a representation of the state and the action(s), increasing the flexibility of the system. The independent representations can then be combined, e.g., via inner-product operation 332, to determine the expectation value.

Figure 4:
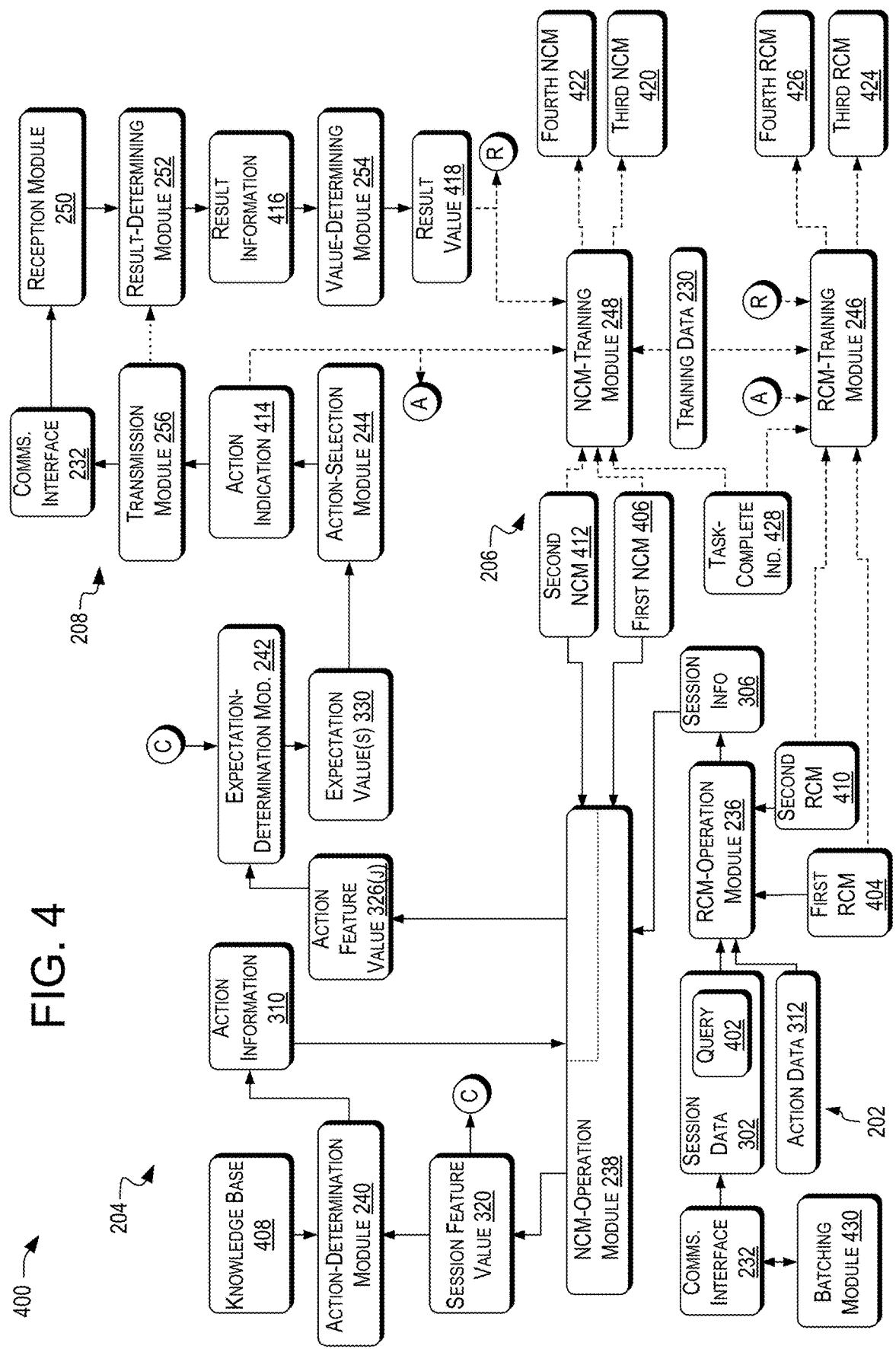
FIG. 4 is a dataflow diagram depicting example module interactions during training and operation of a computational model.

FIG. 4 is a dataflow diagram 400 illustrating example interactions between the modules illustrated in FIG. 2. For clarity, communications interface 232 is depicted multiple places in this figure. Such depiction does not constrain the number of communications interface(s) 232 that may be used. Further details of operations herein are described below with reference to FIGS. 5-12. Modules described below can be configured to perform functions described below. For clarity, data flows primarily related to operation are shown solid and data flows primarily related to training are shown dashed.

In some examples, communications interface 232 can receive session data 302, e.g., textual data of a session such as a user query 402. For example, communications interface 232 can receive at least some of the session data 302 in the form of a Hypertext Transfer Protocol (HTTP) query 402 transmitted via a Transmission Control Protocol (TCP) connection. In some examples omitted for brevity, session data 302 can be retrieved from computer-readable media 222 instead of or in addition to being received via communications interface 232. In some examples, user query 402 can be associated with a user, e.g., entity 110. For example, an HTTP query 402 can include a URL parameter, HTTP cookie, or other identifying information associated with the user.

The RCM-operation module 236 of the representation engine 202 can determine at least some session information 306 based at least in part on the textual data. For example, the RCM-operation module 236 can operate a first recurrent computational model (RCM) 404 to provide the session information 306. The first RCM 404 can represent computational model 304, FIG. 3. In some examples, the RCM-operation module 236 or another module of representation engine 202 can determine a representation of session data 302, e.g., a bag-of-words, one-hot vector sequence, or other representation of text or other contents of the session data 302. The RCM-operation module 236 can operate the first RCM 404 based at least in part on the representation to determine the session information 306. For example, the session information 306 can include an embedding vector output by first RCM 404, as discussed above with reference to FIG. 3. In some examples, the RCM-operation module 236 can operate a second RCM 410, as discussed below. The functions of the RCM-operation module 236 can be divided into two modules or subsystems, one for first RCM 404 and one for second RCM 410.

The NCM-operation module 238 can operate a first network computational model (NCM) 406 to provide a first feature value 320 corresponding to the session based at least in part on at least some of the session information 306. The first NCM 406 can represent computational model 316 and can include, e.g., a multilayer perceptron.

The action-determination module 240 can determine at least one action of a plurality of actions, e.g., as discussed above with reference to action determination block 308. For example, the action-determination module 240 can determine at least one action based at least in part on action data 312 (omitted for brevity) or information in knowledge base 408, as discussed below. The action-determination module 240 can provide information 310 of one or more of the action(s). Various examples of action information 310 are discussed herein. Action information 310 can additionally or alternatively include a representation of content of any of the examples, e.g., output by CM 314, FIG. 3. For example, action information 310 can include a vector representation of content of example action data 312 discussed below.

In some examples, the action information 310 can include text of or representing one of the action(s) (or a vector embedding that represents the text and that is determined by CM 314 from the text, and likewise throughout this document). In an example of Web search, an indication 310 can include the text of a hit record to be presented to the user as a possible match to the query 402. An indication 310 can include multiple fields of data. For example, an indication 310 corresponding to a particular Web-search result can include the title and URL of the respective Web page matching the query 402, an excerpt from the Web page, and a rank of the result in the results to be returned to the user. An indication 310 can include information to be presented to entity 110, e.g., a direct answer to a user query 402. For example, in response to a user query 402 having the text "male lead The Martian," one indication 310 can include a URL of a Web page answering the question, e.g., "https://en.wikipedia.org/wiki/The_Martian_(film)". Another indication 310 can include the direct answer "Matt Damon".

In some examples, the action-determination module 240 can receive the information 310 of one or more of the actions via communications interface 232. In some examples, the action-determination module 240 can determine the information 310 of at least one of the actions based at least in part on the first feature value 320 of the session. In some examples, the action-determination module 240 can determine the information 310 of at least one of the actions based at least in part on information included in a knowledge base 408, e.g., a database. Knowledge base 408 can be stored, e.g., in data store 224.

In some examples, the action-determination module can provide textual or other data of at least one action to the RCM-operation module 236 of the representation engine 202. The RCM-operation module 236 can determine at least some of the information 310 of at least one action based at least in part on the data. For example, the RCM-operation module 236 can operate a second recurrent computational model (RCM) 410 to provide the information 310 of the action, e.g., based at least in part on action data 312, as discussed above with reference to FIG. 3. The second RCM 410 can represent computational model 314, FIG. 3. In some examples, the RCM-operation module 236 can operate the second RCM 410 based at least in part on, e.g., a textual, bag-of-words, one-hot vector sequence, or other representation of text in the action data 302. The information 310 of the action can include an embedding vector, as discussed above with reference to FIG. 3.

The NCM-operation module 238 can operate a second NCM 412 to provide respective second feature values 326(j) of a plurality of actions, and/or one or more actions, e.g., based at least in part on the action information 310. The second NCM 412 can represent computational model 322, FIG. 3, and can include a multilayer perceptron. The dashed line in NCM-operation module 238 indicates that second NCM 412 is used in determining feature value 326 from action information 310. The functions of the NCM-operation module 238 can be divided into two modules or subsystems, one for first NCM 406 and one for second NCM 412.

The expectation-determination module 242 can determine respective expectation values $330(j)$ corresponding to action indications $310(j)$. The expectation values can indicate, represent, or correspond to, e.g., the expected long term value of or resulting from taking the respective actions. The determination of the expectation values can be represented with a function $E(\cdot)$, examples of which are given above, e.g., with reference to Eqs. (6) and (7). For example, the expectation-determination module 242 can compute respective inner products of respective second feature values $326(j)$ with the first feature value 320 as discussed above with reference to inner-product operation 332.

In some examples, the action-selection module 244 can select an action of the plurality of actions based at least in part on one or more of the expectation values 330. For example, the action-selection module 244 can select the action of the plurality of actions corresponding to a highest expectation value 330 of the one or more of the expectation values 330. The action-selection module 244 can provide an indication 414 of the selected action. Indication 414 can be selected from the indications 310.

In some examples, the transmission module 256 can provide the indication 414 of the selected action via the communications interface 232.

In some examples, the reception module 250 can receive result information via communications interface 232. In some examples, the reception module 250 can receive data items or timeout information via communications interface 232, as discussed in more detail below with reference to FIG. 9.

In some examples, the result-determining module 252 can determine result information 416. For example, the result-determining module 252 can determine the result information 416 as information received by the reception module 250, or based at least in part on information received or determined by the reception module 250. In some examples, the result-determining module 252 can determine the result based at least in part on information provided by the transmission module 256, e.g., a timestamp of transmission of the indication 414, as indicated by the dotted arrow.

In some examples, the value-determining module 254 can determine a result value 418 based at least in part on the result information 416. For example, the value-determining module 254 can apply predetermined rules, e.g., stored in knowledge base 408, to result information 416 to determine a result value 418. In some examples in which the reception module 250 receives a data item, e.g., a network packet, the result-determining module 252 or the value-determining module 254 can determine the result information 416 or the result value 418 by extracting the result information 416 or the result value 418 from the received data item. Some examples are discussed below with reference to FIG. 9. In some examples, the value-determining module 254 can copy or extract part or all of the result information 416 to determine the result value 418. For example, the result information 416 can include the result value 418, and the value-determining module 254 can extract the result value 418 from the result information 416.

In some examples, data of action indications 414, result values 418, and feature values 320 can be stored, e.g., for later training by minibatch or experience replay. Examples are discussed below with reference to Table 1. In some examples, data can be stored until a particular task in the session is complete, e.g., a purchase of movie tickets.

In some examples, the NCM-training module 248 can train the first NCM 406 based at least in part on at least one of the selected action 344, the result value 418, or training data 230 to provide a third NCM 420. In some examples, at least the first NCM 406 and/or the third NCM 420 comprises a neural network and the action engine can train the first NCM 406 using a reinforcement-learning update rule. In some examples, the action engine can train the first NCM 406 based at least in part on at least one of the second feature values 326, e.g., $h_{L,a}$ in Eqs. (14) and (15).

In some examples, the NCM-training module 248 can train the second NCM 412 based at least in part on at least one of the selected action 344, the result value 418, or training data 230 to provide a fourth NCM 422. In some examples, at least the second NCM 412 and/or the fourth NCM 422 comprises a neural network and the action engine is configured to train the second NCM 412 using a reinforcement-learning update rule. In some examples, the action engine can train the second NCM 412 based at least in part on the first feature value 320, e.g., $h_{L,s}$ in Eqs. (14) and (15). The functions of the NCM-training module 248 can be divided into two modules or subsystems, one for first NCM 406 and one for second NCM 412. Training individual ones of the first NCM 406 and the second NCM 412 based on feature values provided by the other of the first NCM 406 and the second NCM 412 can cause the representation of state provided by the first NCM 406 and the representation of an action provided by the second NCM 412 to more closely correspond as training progresses. This can permit using simple, computationally inexpensive operations such as inner-product operation 332 to determine expectation values 330.

In some examples, the RCM-training module 246 can train at least one of the first RCM 404 or the second RCM 410 based at least in part on at least one of the selected action 344, the action indication 414, the result value 418, or training data 230 to provide a third RCM 424 or a fourth RCM 426, respectively. In some examples, at least the first RCM 404 and/or the second RCM 410 comprises a recurrent neural network and the representation engine is configured to train the first RCM 404 or the second RCM 410 using a reinforcement-learning update rule. The functions of the RCM-training module 246 can be divided into two modules or subsystems, one for first RCM 404 and one for second RCM 410.

In some examples, e.g., using experience reply, at least one of NCM-training module 248 or RCM-training module 246 can train computational models in response to a task-complete indication 428 or other indication that a particular task is complete. For example, task-complete indication 428 can be provided by entity 110 via a user interface, can be provided by control program 142, or can be determined from the session state, e.g., as represented by session information 306 or session feature value 320. In the example described above of movie-ticket ordering via a Web browser (e.g., control program 142), the task-complete indication 428 can be provided in response to the user's purchase of movie tickets or the user's closure of the Web browser (suggesting the user is done considering buying tickets).

After training by at least one of the NCM-training module 248 or the RCM-training module 246, further actions can be determined, e.g., using the third NCM 420 in place of the first NCM 406, using the fourth NCM 422 in place of the second NCM 412, using the third RCM 424 in place of the first RCM 404, or using the fourth RCM 426 in place of the second RCM 410. Using trained models improving the system's ability to process intent of a query 402 and take relevant actions with respect to entity 110.

In some of the illustrated examples, the training of the first NCM 406 and the second NCM 412 can be coordinated as shown. The NCM-training module 248 can determine a gradient based on a reinforcement-learning update rule, then use backpropagation to train at least one of the first NCM 406 or the second NCM 412 based at least in part on the gradient. Examples are discussed above, e.g., with reference to Eqs. (10)-(22). In some examples, the NCM-training module 248 and the RCM-training module 246 can cooperate to further train at least one of the first RCM 404 or the second RCM 410 based at least in part on the gradient. In some examples, a batching module 430 can be coupled to the communications interface 232. Batching module 430 can provide minibatches of training data 230, e.g., as discussed below with reference to Table 1. The NCM-training module 248 and the RCM-training module 246 can perform training by minibatches.

FIG. 5 is a dataflow diagram depicting an example architecture 500 of a long short term memory cell 502 that can be used in an RCM, e.g., computational models 304 or 314, FIG. 3, or RCMs 404, 410, 424, or 426, FIG. 4. In various examples, the LSTM cell in an RNN-LSTM model can be used to replace the activation function (e.g., non-linear activation function) of the RNN described above with reference to Eq. (8).

In some examples, the LSTM architecture 500 can comprise a cell 502, an input gate $i_t$ 504, an output gate $o_t$ 506, and a forget gate $f_t$ 508. As depicted in FIG. 5, the cell state of the LSTM cell 502 can be represented as vector $c_t$.

In various examples, the gates can be trained to selectively pick what the cell 502 should remember, via input gate $i_t$ 504, pass on via the output gate $o_t$ 506, and forget via the forget gate $f_t$ 508. In some examples, the input gate $i_t$ 504, the output gate $o_t$ 506, and the forget gate $f_t$ 508 can each be trained by a respective neural network (e.g., non-linear transformation). In various examples, the training may be facilitated by applying a stochastic gradient descent (SGD) algorithm, and/or by applying a different algorithm.

The input gate $i_t$ 504, the output gate $o_t$ 506, and the forget gate $f_t$ 508, may comprise respective parameters that are trained to give a desired result. In various examples, the input gate $i_t$ 504 parameter may evolve in such a way that it attenuates unimportant information from an input. In such examples, one or more of the input gate $i_t$ 504 parameter, the output gate $o_t$ 506 parameter, and the forget gate $f_t$ 508 parameter may reduce the effect of unimportant features in a representation H(t) of the input.

Additionally and/or alternatively, one or more of the input gate $i_t$ 504 parameter, the output gate $o_t$ 506 parameter, and the forget gate $f_t$ 508 parameter may be trained to detect and emphasize important information in the input. The parameters can be trained via supervised learning, e.g., as described below with reference to FIG. 6.

In various examples, the LSTM cell 502 may comprise peephole connections, depicted in FIG. 5 as $W_{p1}$, $W_{p2}$, and $W_{p3}$. In such examples, the LSTM cell 502 may comprise a connection to a current cell state $c_t$. Additionally, the LSTM cell 502 may comprise input connections $W_i$, recurrent connections $W_{reci}$, and bias values $b_i$ for i=1, 2, 3, 4.

The LSTM architecture 500 may apply functions g(·), h(·), and a(·) to various vectors. In various examples, g(·) and h(·) may comprise tanh(·) functions, and a(·) may comprise a sigmoid function.

As illustrated in FIG. 5, the forward pass for an LSTM-RNN model can be represented as in Eqs. (23)-(28):

$$H_g(t)=g(M_4 1_1(t)+U_4 H(t-1)+b_4) \tag{23}$$

$$i(t)=\sigma(M_3 X(t)+U_3 H(t-1)+W_{p3} c(t-1)+b_3) \tag{24}$$

$$f(t)=\sigma(M_2 X(t)+U_2 H(t-1)+W_{p2} c(t-1)+b_2) \tag{25}$$

$$c(t)=f(t) \cdot c(t-1)+i(t) \cdot H_g(t) \tag{26}$$

$$o(t)=\sigma(M_1X(t)+U_1H(t-1)+W_{p1}c(t)+b_1) \quad (27)$$

$$H(t)=o(t)\cdot h(c(t)) \quad (28)$$

where (°) denotes a Hadamard (element-wise) product.

In some examples, training can be performed using the Theano package for PYTHON, or another symbolic/numerical equation solver, e.g., implemented in C++, C#, MATLAB, Octave, or MATHEMATICA. For example, at least one of NCM-training module 248 or RCM-training module 246, FIG. 2, can be implemented using, or can include, a Theano model of the corresponding equations. In an example using Theano, equations are defined symbolically in PYTHON code using Theano functions. Any or all of Eqs. (1)-(28) can be expressed in a Theano symbolic representation. A cost function can be defined that computes a difference between the training data and a prediction output from the Theano expression of the model. The Theano "grad" subroutine can then be called to symbolically determine the gradient of the cost function. The Theano "function" subroutine can be called to define a learning-step function that will update the model parameters based on the gradient of the cost function, e.g., according to a gradient-descent algorithm, and return the value of the cost function with the new parameters. To train the model, the learning-step function can be repeatedly called until convergence criteria are met. For example, the learning-step function can be given as input a randomly-selected minibatch of the training data at each call in order to train the model according to stochastic gradient descent (SGD) techniques. In some examples, Theano can be used to jointly train computational models, as described above, using SGD with momentum 0.9 or a batch size of 100. Grid search can be used to select the learning rate for training. Alternatively, models can be trained using various learning rates and the model best satisfying acceptance criteria, e.g., of accuracy, precision, or training time, can be selected. Example learning rates can include 0.1, 0.01, or 0.001. Gradient-clipping or dropouts can be used during training.

Figure 6:
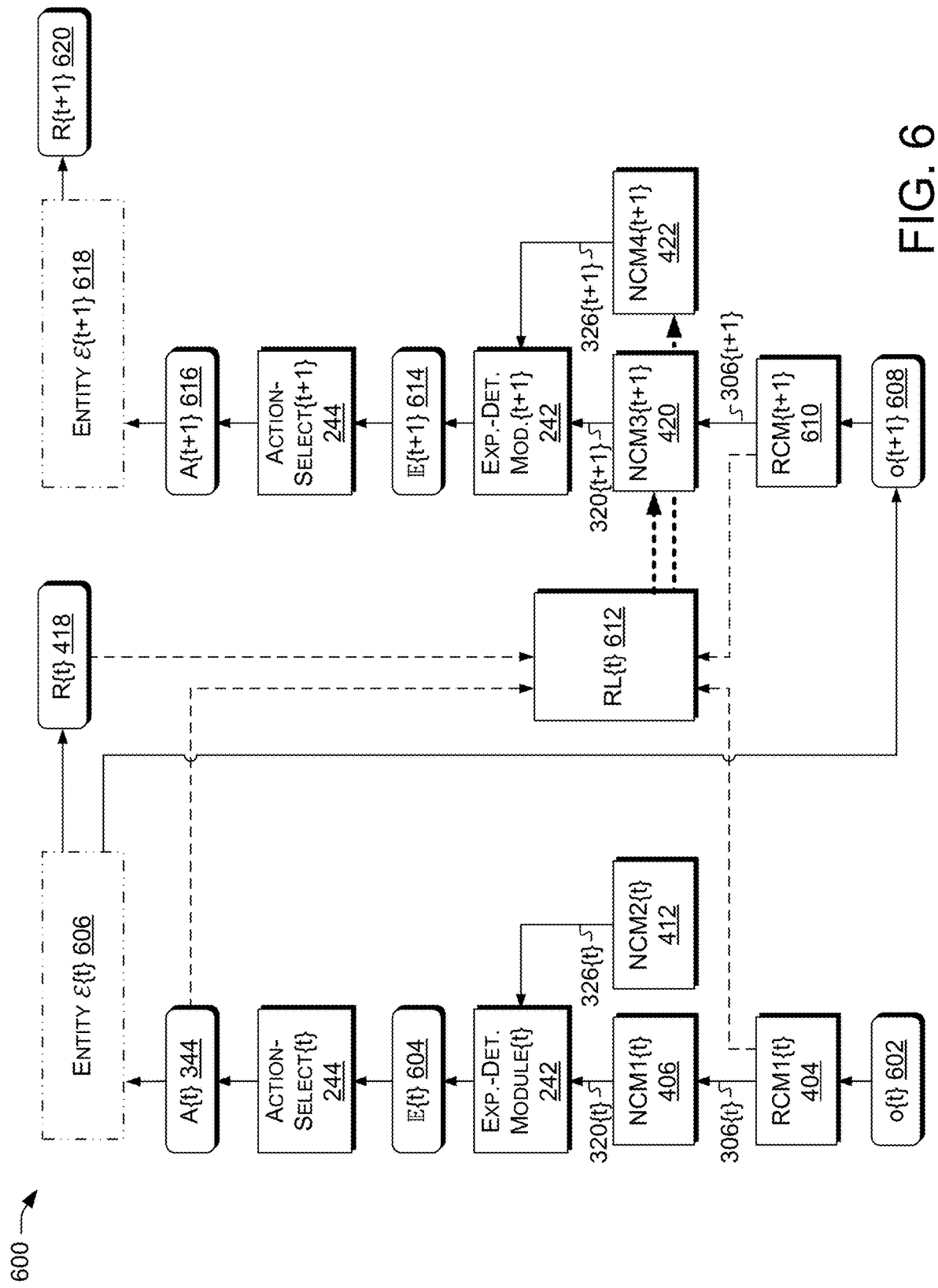
FIG. 6 is a block diagram depicting training and operation of computational models according to various examples described herein.

FIG. 6 is a dataflow diagram 600 illustrating an example implementation of operation and training of computational model(s), e.g., in a computing server. In diagram 600, processing blocks and/or steps, such as the operation and/or application of computational models, are shown with rectangles, and data items are shown with rounded rectangles. The illustrated example computational models are configured for discrete-time operation. Accordingly, an entity (e.g., entity 110), at various time steps, is shown in phantom and discussed below. However, continuous-time operation can also be performed. Two time steps are shown, denoted "{t}" and "{t+1}." A subscript time and a time in curly braces are used interchangeably herein; e.g., $o\{t\} \equiv o_t$. As used herein, the expectation value corresponding to action a at time t is denoted $\mathbb{E}\{t\}(a)$ and/or (equivalently) $\mathbb{E}_t(a)$. In FIG. 6, dash patterns of the connecting lines are used solely for clarity of exposition. Solid lines represent dataflow for operation of the computational models, dashed lines represent dataflow for training of computational model(s), and heavy lines represent parameter updates. The illustrated dataflow is an example; other dataflows can be used as described herein.

In the illustrated example, a first observation value 602 (o{t}) is provided, e.g., by reception module 250. The first observation value 602 can be received via the communications interface 232. The first observation value 602 is provided to a first RCM 404 (RCM1{t}), e.g., including one or more LSTM cells 502, FIG. 5, and/or one or more other recurrent structures described above with reference to computational model 304 or RCM 404. In the context of reinforcement learning, first observation value 602 can represent at least a portion of a state of the session or of the entity 110. In some examples, first observation value 602 can include a query 402 from entity 110 or other textual data of a session.

The first RCM 404 is operated to provide session information 306{t} (referred to herein as s{t}). For example, the first RCM 404 can be operated based on the first observation value 602 to provide the session information 306{t}. In the context of reinforcement learning, first session information 306{t} can represent at least a portion of a state of the session or of the entity 110. The session information 306{t} is provided to a first NCM 406.

The first NCM 406 is operated based at least in part on the session information 306 to provide a first feature value 320{t} corresponding to the session at time t.

Similarly, the second NCM 412 is operated to provide respective second feature values 326{t} corresponding to individual actions of a plurality of actions available at time t. For brevity, action-determination module 240 is omitted from FIG. 6.

Expectation-determination module 242 can then determine an expectation vector 604 ($\mathbb{E}\{t\}$) including one or more, and/or a plurality of, expectation values 330, e.g., based at least in part on first feature value 320 and second feature values 326. As noted above, the expectation values can correspond to respective actions of one or more, and/or a plurality of, actions.

In some examples, action-selection module 244 can select at least one of the actions, e.g., action 344, based at least in part on at least some of the expectation values 330 in the expectation vector 604, and can determine a respective indication 414 (omitted for brevity) of the selected action(s) 344 (A{t}). In an example, the action-selection module 244 can select the action(s) corresponding to the highest (and/or n highest) expectation values 330 in the expectation vector 604. This is discussed in more detail below with reference to Table 1.

An indication of at least one of the plurality of actions can then be provided via the communications interface 232. For example, indication 414 of the selected action 344 can be provided using transmission module 256.

Via the communications interface 232, the selected action can be provided to, or take effect with respect to, a first entity 606 ($\in\{t\}$), e.g., a first state of an ongoing and/or continuously-existing entity 110. A result value 418 (R{t}), can be detected or otherwise determined, e.g., received via the communications interface 232. In the context of reinforcement learning, the result value can represent a reward value.

After indication 414 is provided, session information 306 can be updated. For example, first entity 606 can provide a second observation value 608 (o{t+1}), e.g., a query, which can be received, e.g., via the communications interface 232. An RCM 610, e.g., first RCM 404 or third RCM 424, can provide session information 306{t+1} based at least in part on second observation value 608.

The first NCM 406 can then be trained based at least in part on a reinforcement-learning (RL) update rule applied to at least one of session information 306{t} (state), session information 306{t+1} (updated state), indication 414 of the selected action 344 (action), or the result value 418 (reward) to provide third NCM 420 (NCM3{t+1}). The training can be performed by a reinforcement-learning operation 612 (RL{t}), e.g., a reinforcement-learning update rule. For example, reinforcement-learning operation 612 can include applying the Bellman Equation and/or its equivalent in a reinforcement-learning framework, e.g., as discussed herein with reference to Table 1 and Eqs. (10)-(22). Additionally or alternatively, at least one of the second NCM 412, the first RCM 410, or the second RCM 410 can be trained by reinforcement-learning operation 612 (training dataflow omitted for brevity). In the illustrated example, reinforcement-learning operation 612 determines the third NCM 420 and the fourth NCM 422.

In some examples, the third NCM 420 (or the first NCM 406, if training has not been performed or if the results of training have not yet been applied) can be operated based at least in part on the session information 306{t+1} at time t+1 to provide a first feature value 320{t+1} corresponding to the session at time t+1. Similarly, the trained fourth NCM 422 (or the second NCM 412) can be operated to provide respective second feature values 326{t+1} corresponding to individual actions of a plurality of actions available at time t+1. The actions available at t+1 can be different from the actions available at time t. For example, at least one action can be available at time t+1 but not at time t, or vice versa.

The above-described operations illustrated in FIG. 6 can be repeated one or more times. For example, expectation-determination module 242 can determine a second expectation vector 614 ($\mathbb{E}\{t+1\}$). Action-selection module 244 can be select a second action 616 (A{t+1}) based at least in part on the second expectation vector 614. The second selected action 616 can relate to, be presented to, or affect a second entity 618 ($\in\{t+1\}$), e.g., the entity 110 at a later time than the first entity 606. For example, an indication of the second selected action 616 can be provided to the second entity 618. A second result value 620 (R{t+1}) can be determined, e.g., based on data from, or on data relating to communications with, the second entity 618. Training can then be performed, e.g., using reinforcement-learning operation 612 with data from timestep t+1 instead of timestep t.

In some examples, training and operation are performed as listed in Table 1. The example in Table 1 is for minibatch-based stochastic gradient descent with experience replay. In some examples of Table 1, step 8, the action $a_t$ can be determined as in Eq. (29), in which α is a parameter determining the amount of exploration of the action space. For α=0, all actions are sampled uniformly; for α=∞, no exploration is performed.

$$\pi(a_t = a_t^i \mid s_t) = \frac{\exp(\alpha \cdot E(s_t, a_T^i))}{\sum_{j=1}^{|\mathcal{A}_T|} \exp(\alpha \cdot E(s_t, a_T^j))} \tag{29}$$

TABLE 1

| | |
|---|---|
| 1 | Initialize replay memory $\mathcal{D}$ to capacity N. |
| 2 | Initialize network computational models 316, 322 with small random weights. |
| 3 | Initialize game simulator and load dictionary. |
| 4 | for episode = 1, . . . , C: |
| 5 | Read raw state text and a list of action texts, and convert them to representation $s_j$ and $a_1^1, a_1^2, \ldots, a_1^{|\mathcal{A}_1|}$. |
| 6 | for timestep = 1, . . . , T: |
| 7 | Compute $\mathbb{E}\{t\} = [E(s_t, a_t^i; \Theta) \mid i \in [1, |\mathcal{A}_t|]]$ for the list of actions using forward activation, e.g., as in Eqs. (1)-(8). |
| 8 | Select an action $a_t$ based on probability distribution $\pi(a_t = a_t^i \mid s_t)$, e.g., an arg max or argmax with an exploration policy such as Eq. (29). |
| 9 | Execute action $a_t$. |
| 10 | Observe result value (reward) $r_t$. Read the next state text and the next list of action texts, and convert them to representation $s_{t+1}$ and $a_{t+1}^1, a_{t+1}^2, \ldots, a_{t+1}^{|\mathcal{A}_{t+1}|}$. |
| 11 | Store transition $(s_t, a_t, r_t, s_{t+1})$ in $\mathcal{D}$. |
| 12 | Sample random mini batch of transitions $(s_k, a_k, r_k, s_{k+1})$ from $\mathcal{D}$. |
| 13 | Set $y_k = r_k$ if $s_{k+1}$ is terminal, $y_k = r_k + \gamma \max_{a'} E(s_{k+1}, a'; \Theta))$ otherwise. |
| 14 | Perform a gradient descent step on $(y_k - E(s_k, a_k; \Theta))^2$ with respect to the network parameters $\Theta$ (e.g., as in Eqs. (10)-(22)). Back-propagation is performed only for $a_k$ in some examples, even though there are $|\mathcal{A}_k|$ actions at time k. |
| 15 | next timestep |
| 16 | next episode |

In some examples, the algorithm in Table 1 is performed online. For example, the steps can be performed for each individual action and result. In some examples, the algorithm in Table 1 is performed offline. For example, actions, results, and observations can be recorded in minibatches in training data 230. Training can then be performed offline using one or more minibatches, e.g., a plurality of minibatches.

In some examples, the algorithm in Table 1 is performed partially offline. For example, during operation of the first NCM 406 and the second NCM 412, the batching module 430 can store a selected number (e.g., 100) of sets of training data 230, e.g., the $s_t$, $a_t$, $r_t$, and $s_{t+1}$ values in Table 1, line 11. Once the selected number of sets has been stored, the reinforcement-learning operation 612 can be carried out using the stored training data 230 to determine at least one of the third NCM 420 or the fourth NCM 422. Training can be performed in a stochastic manner, e.g., by selecting minibatches at random from training data 230.

In a minibatch and/or other offline and/or partially offline training configuration, the loop structure shown in Table 1 can be rearranged. For example, lines 7-11 can be performed multiple times, e.g., before lines 12-14 are performed, and/or in parallel with performance of one or more of lines 12-14. Operating in batch can improve processing speed and/or stability of the training process. Using stochastic techniques, e.g., as in Table 1, line 14, can provide improved speed of convergence and/or improved numerical stability of the training process.

Illustrative Processes

Figure 7:
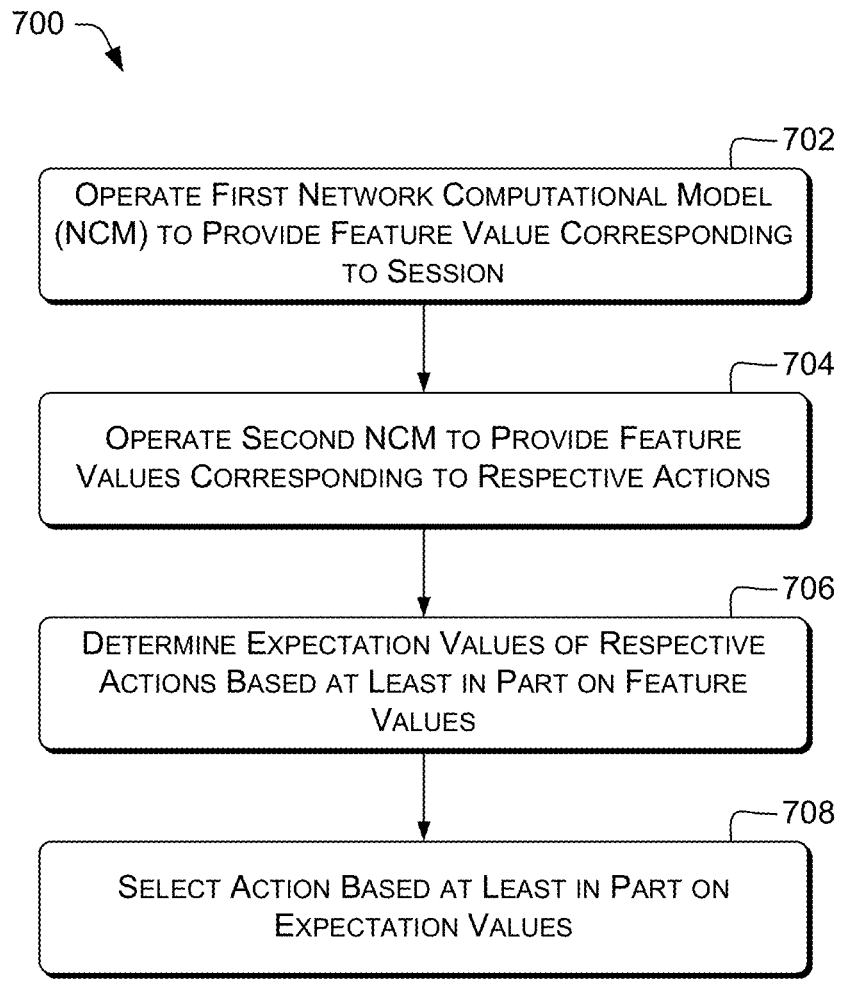
FIG. 7 is a flow diagram that illustrates example processes for operating computational models according to various examples described herein.

FIG. 7 is a flow diagram that illustrates an example process 700 for training and operating computational model(s). Example functions shown in FIG. 7 and other flow diagrams and example processes herein can be implemented on and/or otherwise embodied in one or more computing device(s) 102 and/or 104, e.g., a computing device 200, e.g., using software running on such device(s). For the sake of illustration, the example process 700 is described below with reference to processing unit 218 and other components of computing device 200, FIG. 2, that can carry out and/or participate in the steps of the exemplary method. However, other processing unit(s) such as processing unit 114 and/or other components of computing device(s) 102 and/or 104 can carry out step(s) of described example processes such as process 700. Similarly, exemplary method(s) shown in FIGS. 7, 8, 9, 11, and 12 are also not limited to being carried out by any specifically-identified components.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 7, 8, 9, 11, and 12 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions.

In some examples, at block 702, a first network computational model (NCM) 406, e.g., a session NCM, can be operated based at least in part on session information 306 to provide a first feature value 320 corresponding to the session. Examples are discussed above, e.g., with reference to NCM-operation module 238, computational model 316, and first NCM 406. In some examples, block 702 can include determining a first feature value 320 corresponding to a session by operating a first network computational model (NCM) 406 based at least in part on session information 306.

In some examples, at block 704, a second NCM 412, e.g., an action NCM, can be operated to provide respective second feature values 326 corresponding to individual actions of a plurality of actions. Examples are discussed above, e.g., with reference to NCM-operation module 238, computational model 322, and second NCM 412. In some examples, block 704 can include determining respective second feature values 326 corresponding to individual actions of a plurality of actions by operating a second NCM 412. The second NCM 412 can use a common set of parameters in determining the second feature values 326. For example, each of the second feature values 326(*j*) can be determined using the same parameters of NCM 412 as each of the other second feature values 326(*j*).

In some examples, at block 706, respective expectation values 330 of at least some of the actions of the plurality of actions can be determined based at least in part on the first feature value 320 and the respective second feature values 326. The expectation values 330 can be elements in an expectation vector 604, as discussed above. Examples of determining the expectation values 330 are discussed above, e.g., with reference to expectation-determination module 242 and expectation determination block 328. In some examples, block 706 can include determining respective expectation values 330(*j*) of at least some of the actions A(*j*) of the plurality of actions based at least in part on the first feature value 320 and the respective second feature values 326(*j*). Expectation values 330 can be determined, e.g., using inner-product operation 332, bilinear operation 334, or computational-model operation 336, as described above with reference to FIG. 3.

For example, the expectation values 330 can be determined as respective inner products of respective ones of the second feature values 326 with the first feature value 320. Specifically, in some examples, the first feature value 320 and at least the second feature value 326 corresponding to at least one action of the plurality of actions can include respective vectors. Block 706 can include determine the expectation value 330 corresponding to the at least one action as an inner product of the first feature value and the second feature value corresponding to the at least one action. Inner products can be performed for any number of the actions of the plurality of actions.

In some examples, at block 708, a first action 344 of the plurality of actions can be selected based at least in part on at least one of the expectation values 330. Examples are discussed above, e.g., with reference to action-selection module 244 and action-selection block 342. In some examples, block 708 can include selecting the first action 344 of the plurality of actions based at least in part on at least one of the expectation values 330.

Figure 8:
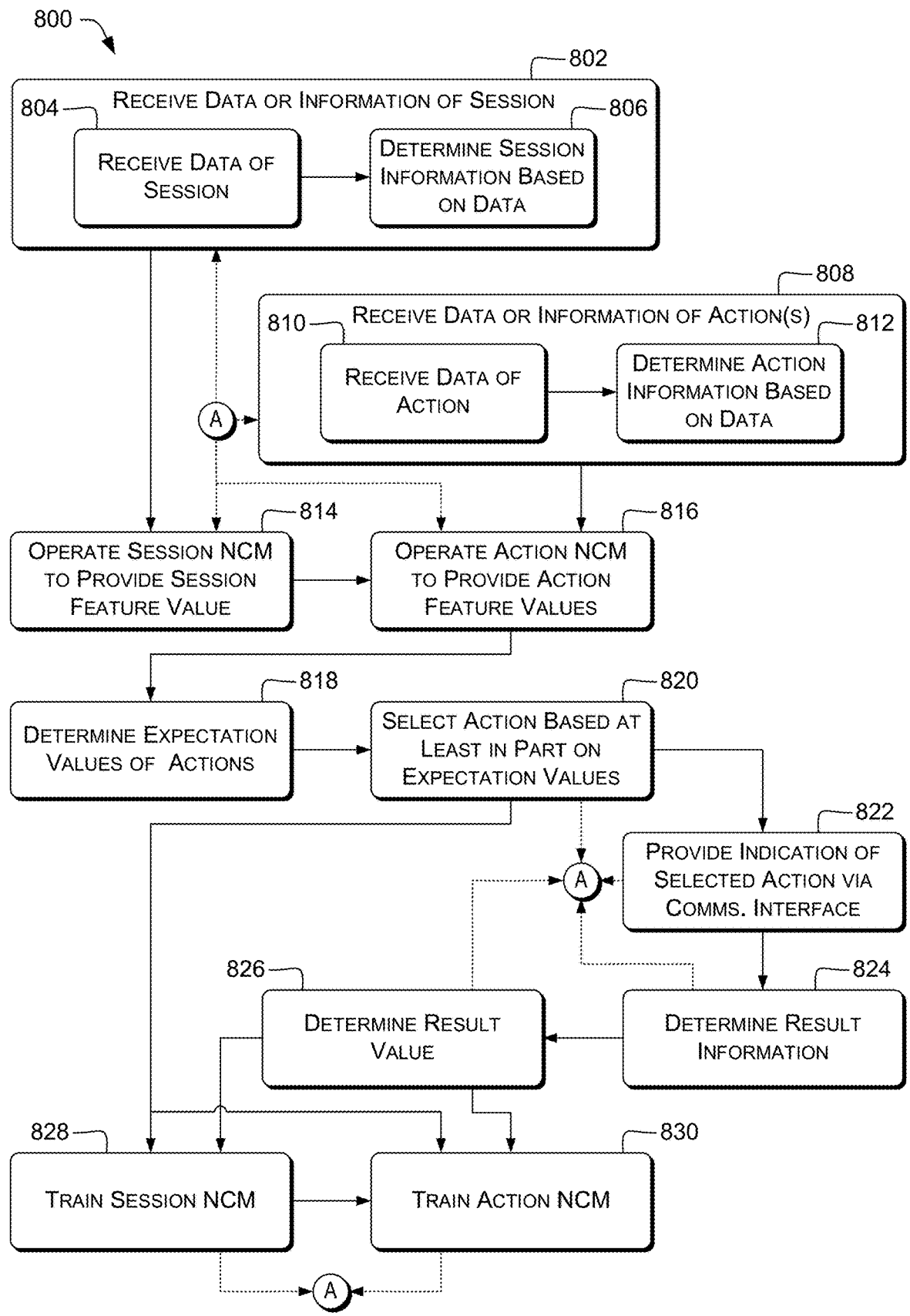
FIG. 8 is a flow diagram that illustrates example processes for training and operating computational models and selecting actions according to various examples described herein.

FIG. 8 is a flow diagram that illustrates an example process 800 for training and operating computational model(s). Block 702 can be preceded by at least one of blocks 802-812. Block 708 can be followed by at least one of blocks 822-830.

In some examples, at block 802, session data 302 or information 306 can be received via the communications interface 232. Examples are discussed above, e.g., with reference to communications interface 232 and observation values 602, 608. For example, the communications interface 232 can receive the information 306, e.g., a query represented in a bag-of-words format. In some examples, block 802 can include blocks 804 and 806. Block 802 can be followed by block 814.

In some examples, at block 804, session data 302 can be received. The session data 302 can include textual data, numeric data, or other types of data described above with reference to FIG. 3. Examples are discussed above, e.g., with reference to communications interface 232. In some examples, block 804 can include receiving the session data 302 including at least one data item via a network interface. For example, the data item can include an HTTP GET request specifying a query. For example, the query "Who founded Microsoft?" can be expressed as an HTTP GET request to www.bing.com for the resource named "/search?q=who+founded+Microsoft %3F". In this example, the data item can include that resource name, the full URL "https://www.bing.com/search?q=who+founded+Microsoft %3F", or the extracted query itself, "who founded Microsoft?"

In some examples, at block 806, at least part of the session information 306 can be determined based at least in part on the textual or other session data 302. For example, block 806 can include determining an embedding in feature space that represents the session data 302. Examples are discussed above, e.g., with reference to RCM-operation module 236, CM 304, CM 314, and first RCM 404. In some examples, block 806 can include operating a recurrent computational model (RCM) such as first RCM 404 to determine the at least part of the session information 306 based at least in part on the session data 302. Examples are discussed above, e.g., with reference to RCM-operation module 236, CM 304, and RCM 404. In some examples, block 806 can include determining the session information 306 based at least in part on the at least one data item. Continuing the example above, the data item, e.g., the extracted query "who founded Microsoft?" can be provided to CM 304, e.g., in a bag-of-words or sequential one-hot vector representation, and the output of CM 304 can be incorporated into the session information 306.

In some examples, at block 808, data or information of at least one action of the plurality of actions can be received. The data or information can be received, e.g., via the communications interface 232. Examples are discussed above, e.g., with reference to block 802. In some examples, block 828 can include blocks 810 and 812. Block 808 can be followed by block 816.

In some examples, at block 810, textual data of at least one action of the plurality of actions can be received, e.g., via the communications interface 232. Examples are discussed above, e.g., with reference to block 804.

In some examples, at block 812, a representation of the textual data can be determined. Examples are discussed above, e.g., with reference to block 806. For example, block 812 can include operating a recurrent computational model (RCM) such as second RCM 410 to determine the at least part of the information of the action based at least in part on the textual or other data of the action. The representation can include, e.g., output values from artificial neurons in an output layer of second RCM 410 or another computational model 314. Examples are discussed above, e.g., with reference to RCM-operation module 236, CM 314, and RCM 410.

In some examples, at block 814, which can represent block 702, FIG. 7, a session NCM such as first NCM 406 can be operated to provide a session feature value, e.g., a first feature value 320.

In some examples, at block 816, which can represent block 704, FIG. 7, an action NCM such as second NCM 412 can be operated to provide respective action feature values, e.g., second feature values 326(*j*), for respective actions of a plurality of actions.

In some examples using block 812, block 816 can include determining the second feature value 326(*j*) corresponding to the at least one action based at least in part on the representation determined in block 812. For example, the representation can be provided as input to second NCM 412 or another computational model 322, and the second feature value can be an output of the second NCM 412 or other computational model 322. Examples are discussed above, e.g., with reference to FIGS. 3 and 4.

In some examples, at block 818, which can represent block 706, FIG. 7, respective expectation values 330 of the actions can be determined, e.g., as discussed above.

In some examples, at block 820, which can represent block 708, FIG. 7, an action 344 can be selected or an indication 414 determined based at least in part on the respective expectation values 330 of the actions, e.g., as discussed above.

In some examples, at block 822, an indication of the first action 344 can be provided, e.g., transmitted, via the communications interface 232, e.g., a network interface. Examples are discussed above, e.g., with reference to transmission module 256.

In some examples, at block 824, result information can be determined. Block 824 can be performed, e.g., concurrently with, or after, block 822. Examples are discussed above, e.g., with reference to result-determining module 252 and result information 416. For example, block 824 can include determining the result information by receiving the result information via the communications interface 232.

In some examples, there may be a time delay between block 822 and block 824. In an example of providing information about available taxis to a user (entity 110), block 822 can include providing a recommendation of a taxi. Block 824 can include receiving information about the user's customer-satisfaction level. The customer-satisfaction information may be available before or during the user's taxi ride, but may be available only days or weeks after the user rides the taxi.

In some examples, at block 826, a result value 418 can be determined based at least in part on the result information. Examples of are discussed herein, e.g., with reference to value-determining module 254 and result value 418, and with reference to FIG. 9. In some examples, block 826 can include providing the task-complete indication 428 to trigger training of computational models based on the determined result value. Block 826 can be followed by at least one of blocks 828 or 830.

In some examples, at block 828, the session NCM, e.g., first NCM 406, can be trained based at least in part on the first action 344 and a result value 418 to provide a third NCM 420, which can then be used as the session NCM. In some examples, the first NCM 406 can be trained further based on at least one of the second feature values 326, e.g., the second feature value 326 corresponding to the selected action 344, which is indicated by indication 414. Examples of training are discussed above, e.g., with reference to the NCM-training module 248, first NCM 406, and third NCM 420. For example, the first NCM 406 can include a neural network and block 828 can include training the first NCM 406 using a reinforcement-learning update rule. In some examples, neuron parameters of the first NCM 406, e.g., weights w and biases b, can be input to Eqs. (10)-(17). Parameters of third NCM 420 can then be determined by modifying corresponding parameters of first NCM 406 as in Eqs. (18)-(22).

In some examples, at block 830, the action NCM, e.g., the second NCM 412, can be trained based at least in part on the first action 344 and the result value 418 to provide a fourth NCM 422, which can then be used as the action NCM. In some examples, the second NCM 412 can be trained further based on at least the first feature value 320. Examples of training are discussed above, e.g., with reference to the NCM-training module 248, the second NCM 412, and the fourth NCM 422. For example, the second NCM 412 can include a neural network and block 828 can include training the second NCM 412 using a reinforcement-learning update rule. In some examples, neuron parameters of the second NCM 412, e.g., weights w and biases b, can be input to Eqs. (10)-(17). Parameters of fourth NCM 422 can then be determined by modifying corresponding parameters of second NCM 412 as in Eqs. (18)-(22). In some examples, block 830 can include determining a common revised set of parameters for the fourth NCM 422, e.g., parameters that can be used to determine second feature values 326(*j*) for multiple actions A(j).

Blocks 828 and 830 can be performed in a coordinated manner in a joint training process. For example, the first NCM 406 and the second NCM 412 can comprise respective neural networks and the training engine 206 can train the first NCM 406 and the second NCM 412 using a reinforcement-learning update rule, e.g., as described above with reference to reinforcement-learning operation 612. In some examples, at least one of blocks 828 and 830, or blocks 828 and 830 in a coordinated manner, can further train or otherwise adjust parameters of expectation determination block 328, e.g., parameters 338 of bilinear operation 334 or neuron parameters of CM 340 of CM operation 336. Training can be conducted, e.g., using gradient descent, the gradient computed based at least in part on a reinforcement-learning update rule.

In some examples, as graphically represented by the "A" on-page connector, at least one of blocks 820, 822, 824, 826, 828, or 830 can be followed by at least one of blocks 802, 808, 814, or 816 (lines shown dashed for clarity). As discussed above with reference to FIG. 6, this can permit taking multiple actions, e.g., over the course of a session, using predetermined CMs or using CMs that are trained as the session progresses.

Specifically, in some examples, block 802 can include receiving revised session information 306{t+1}. After training of at least one of the NCMs 406 or 412 in blocks 828 or 830, block 814 can include determining a first revised feature value 320{t+1} corresponding to the session by operating the third NCM 420 (the session NCM, post-training, in this example) based at least in part on the revised session information 306{t+1}.

In some examples, block 816 can include determining respective second revised feature values 326{t+1} corresponding to the actions by operating the fourth NCM 422 (the action NCM, post-training, in this example). In some examples, the fourth NCM 422 can use the common revised set of parameters determined in block 830 in determining the second feature values.

In some examples, block 818 can include determining respective revised expectation values 330{t+1} of at least some of the actions of the plurality of actions based at least in part on the first revised feature value 320{t+1} and the respective second revised feature values 326{t+1}.

In some examples, block 820 can include selecting a second action of the plurality of actions based at least in part on at least one of the revised expectation values 330{t+1}.

Figure 9:
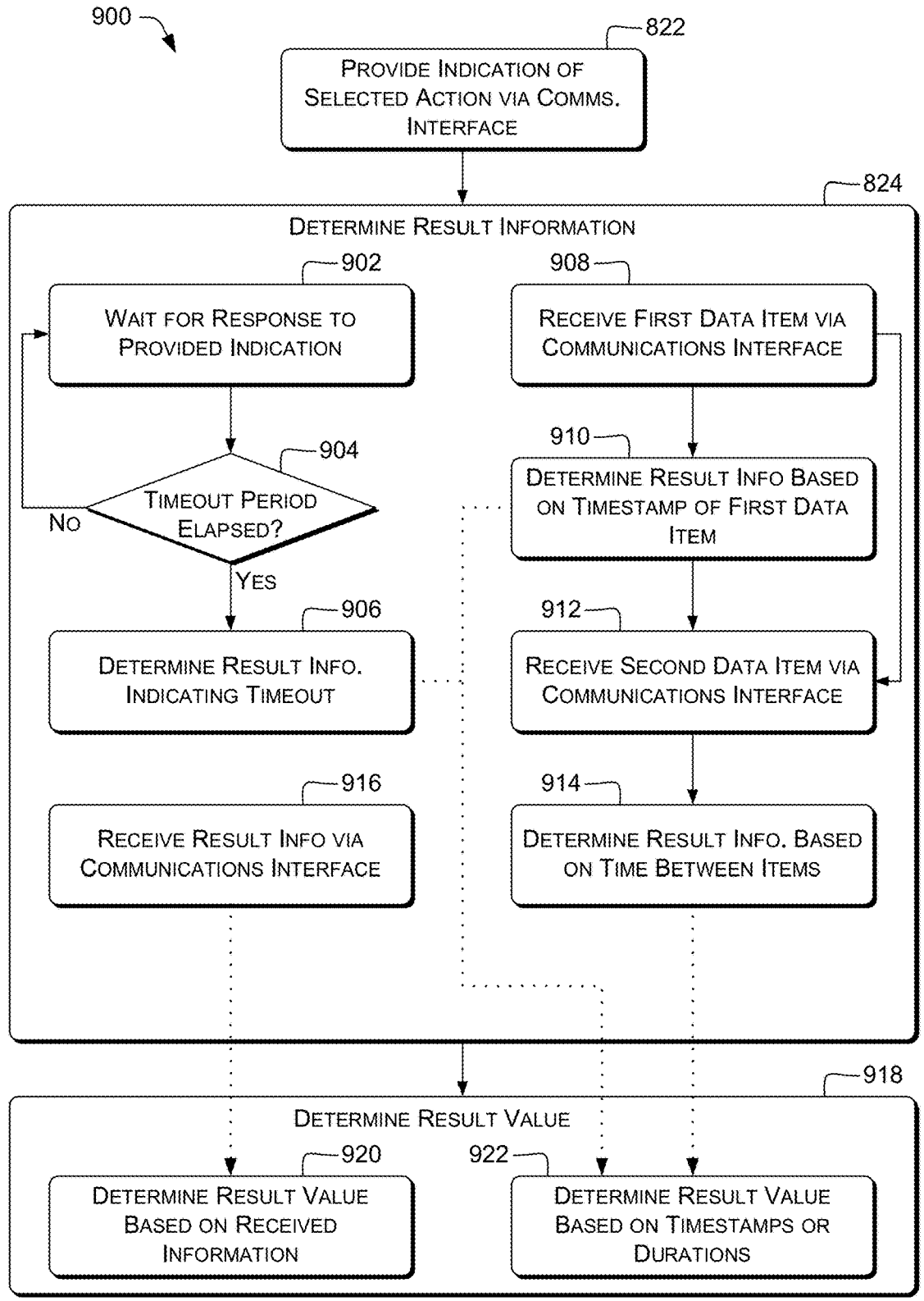
FIG. 9 is a flow diagram that illustrates example processes for determining result information or values according to various examples described herein.

FIG. 9 is a flow diagram that illustrates an example process 900 for determining result information, e.g., as discussed above with reference to block 824, FIG. 8. In some examples, block 822 can be followed by block 902, block 908, or block 916. For clarity of explanation, examples of result values 418 are discussed herein with reference to scalar, real- or integer-value result values 418, in which higher (or more positive) result values 418 indicate higher user satisfaction or a more preferable action than do lower (or more negative) result values 418. However, these examples are not limiting. In other examples, more preferable outcomes can be represented by more negative result values 418, with suitable changes to Eq. (10) or other equations herein. In still other examples, result values 418 can be elements of a finite set of discrete numerical values, ordinal values, categorical values, or Boolean values (e.g., success vs. failure).

In some examples, at block 902, a response to the provided indication 414 can be awaited. For example, the communications engine 208, e.g., the reception module 250 can wait for a selected timeout period for data to be received the communications interface 232.

At decision block 904, it can be determined whether the timeout period has elapsed without receiving a response to the indication 414 of the first action 344. If not, processing can resume in block 902. If so, processing can continue to block 906.

In some examples, control program 142 on computing device 104 can provide additional information. For example, a client-side heartbeat script running in a Web browser (or other control program 142) can provide information about "dwell time," the amount of time a particular Web page is maintained in the user's view or in a focused or visible state. In some examples, control program 142 can further provide an indication if, e.g., the Web browser tab or application showing the provided indication 414 is closed or terminated. In some examples, block 904 can include determining whether the timeout period has elapsed based at least in part on dwell-time information, e.g., provided by control program 142 or measured by computing device 102. For example, block 904 can include, in response to control program 142 reporting that the Web browser has been closed, determining that the timeout period has elapsed, regardless of the actual amount of wall-clock (real) time that has passed.

In some examples, at block 906, the result information can be determined indicating that the timeout period has elapsed. For example, the result information can include a Boolean, bit field, flag, or other value indicating whether or not the timeout elapsed, and block 906 can include setting that value to indicate the timeout did elapse. In some examples, block 906 can include determining result information including, indicating, or otherwise based at least in part on, dwell-time information from control program 142.

In some examples, the result value can be determined based at least in part on respective timestamps of at least two data items received via a network interface In some examples, at block 908, a first data item can be received via the communications interface 232. The first data item can be associated with the session. For example, the first data item can include a heartbeat signal, cookie-setting message, pingback, HTTP request, onClick alert, or other message indicating user interaction (or lack thereof) with the provided indication 414 of the selected action, e.g., provided search results. Block 908 can be followed by block 910 or block 912.

In some examples, at block 910, the result information 416 can be determined based at least in part on a timestamp of the received first data item. For example, the result information 416 can be determined to include the timestamp or a value derived from the timestamp, such as whether or not the first data item was received during the daytime. In some examples, the result information 416 can be determined based at least in part on or indicating a duration between providing of the indication 414 of the selected action 344 (block 822) and receiving of the first data item (block 908).

In some examples, at block 912, a second data item can be received via the communications interface 232. The second data item can be associated with the session. The second data item can include data of one or more types described above with reference to the first data item, and can include data of same type(s) as the first data item or of different type(s).

In some examples, at block 914, the result information can be determined based on, e.g., indicating, a time between items. Block 914 can include determining the result information including a duration between a timestamp of receipt of the first data item and a timestamp of receipt of the second data item. The duration can be measured in seconds, ticks, packets received or transmitted, or other time measures.

In some examples, at block 916, the result information 416 can be received via the communications interface 232, e.g., a network interface. Examples are discussed below.

In some examples, block 918 can include determining the result value 418 based at least in part on the result information 416 determined in block 824. The result information 416 can be determined, e.g., as described above with reference to blocks 902-916. Block 918 can represent block 826, FIG. 8.

In some examples using block 916, block 920 can include determining the result value based at least in part on the received result information. For example, block 920 can include determining the result value to be a value received via the network interface and incorporated into result information 416.

In some examples, indication 414 can include or be accompanied with data of one or more controls (or other user-interface or feedback elements, e.g., buttons or hypertext links, and likewise throughout this paragraph) configured to solicit user feedback regarding the selected action 344. For example, indication 414 can be transmitted as part of a Web page including hypertext links for "thumbs-up" and "thumbs-down" buttons. In some examples, block 916 can include receiving data indicating that such links were clicked, or that other controls were operated to indicate a satisfaction of entity 110 with the selected action 344. In some of these examples, block 920 can include determining the result value based at least in part on the received data indicating operation of such controls by entity 110. For example, block 920 can include at least one of: determining a positive result value 418 in response to user actuation of a "Like" or "thumbs-up" link, or determining a negative result value 418 in response to user actuation of a "Dislike" or "thumbs-down" link.

In some examples, block 916 can include receiving data indicating a change in the user's view of results provided in the course of carrying out the selected action 344. In a Web-search example, the selected action 344 can include presenting a list of links to search results. Block 916 can include receiving, e.g., from a client-side heartbeat script or other component of control program 142 or computing device 104, an indication that the user has opened one or more links, e.g., in different browser tabs, or that the user has changed from viewing one tab or result to viewing another tab or result. In some of these examples, block 920 can include determining the result value based at least in part on the received data indicating such view changes. For example, block 920 can determine a result value 418 inversely proportional to the number of view changes before a subsequent query or a timeout. In this example, if the first result link the user clicks provides the user with desired information, the result value 418 will be relatively higher. However, if the user has to click multiple result links before finding the desired information, as indicated by multiple view changes, the result value 418 will be relatively lower.

In another example in which an action includes presenting search results, block 920 can include determining, e.g., a positive result value 418 if the user clicks a link on a presented page of search results (as indicated by data received in block 916), and determining a less positive, zero, or negative result value 418 if the user does not click a link on the page of search results, or of the user clicks a "next page" link to receive more results. In this example, if the first page of search results includes a link of interest to the user, the result value 418 is higher than if the first page does not include such a link.

In another example, the selected action 344 can include presenting a direct answer. For example, entity 110, via computing device 104, can provide a query "first president of the United States" to an information-retrieval service, e.g., operated by or on computing device 102. Computing device 102 can consult a database and determine that one possible action is to provide the answer "George Washington." Computing device 102 can take that action by transmitting "George Washington" (the indication 414) to computing device 104. Computing device 102 can also transmit a "more results" link or other control in association with the indication 414. In some of these examples, block 916 can include receiving an indication of whether the user (entity 110) has clicked the "more results" link. Block 920 can include determining a relatively lower result value 418 is the user clicks the "more results" link than if the user does not click the "more results" link, e.g., before closing the page or tab showing indication 414, or before a timeout has elapsed. If the user does not click the link, the provided information (indication 414) was likely sufficient to answer the user's question. However, if the user does not click the link, the provided information was likely not sufficient to answer the user's question.

In some examples, block 916 can include receiving information from one or more third parties about user satisfaction with the selected action 344. Block 920 can include determining the result value 418 based at least in part on the received information. For example, the session can involve interactions between a user and a taxi-reservation service. Actions can include one or more of: presenting links to taxi companies; presenting contact information for taxi companies; presenting reviews for taxi companies or drivers; presenting a reservation interface to permit the user to directly schedule a taxi pickup; or presenting alternatives to taxi transportation. In an example in which the selected action 344 is to present a reservation interface for a particular taxicab company, the result information 416 can include an amount paid by the customer for the taxi ride. Block 920 can include determining a result value 418, e.g., proportional to the difference between the amount paid and the average amount paid for that fare, or proportional to the difference between the tip percentage paid and a typical percentage, e.g., 10% or 15%. In this way, the result value 418 can indicate how satisfied the user was with the cab ride, measured by the user's willingness to pay.

In some examples using block 906, block 910, or block 914, the result value can be determined based at least in part on a timestamp of the first data item, or on a time duration determined based at least in part on a timestamp of the first data item.

In some examples, at block 922, the result value 418 is determined based at least in part on respective timestamps of a plurality of data items, e.g., the first and second data items, received via communications interface 232, e.g., a network interface. In some examples, at block 922, the result value 418 is determined based at least in part on a timestamp of the first data item. In some examples, at block 922, the result value 418 is determined based at least in part on a duration between a timestamp of transmission of indication 414 (in block 822) and a timestamp of receipt of the first data item or of another data item of a plurality of data items.

In some examples using blocks 906 and 922, the session can include an interaction between entity 110 operating a computing device 104 and computing device 102 operating an information-retrieval service. For example, the information-retrieval service can answer the query "who was the first president of the United States" with the answer "George Washington," as discussed above with reference to block 920.

Entity 110, e.g., if satisfied with the provided answer, can use that answer in ways that do not involve interaction with computing device 102 (or that do not involve interaction with the information-retrieval service). In this situation, block 906 can include determining that the timeout period has elapsed. In response, block 922 can include determining that the task was completed successfully, and determine, e.g., a positive result value 418 or other indication of task success. Alternatively, entity 110, e.g., if not satisfied with the provided answer, can submit further queries to computing device 102. In this situation, block 906 can include determining that the timeout period has not elapsed, e.g., further communications have been received before the end of the timeout period. In response, block 922 can include determining that the task was not completed, or was not completed successfully. Block 922 can include, in response, refraining from determining a result value 418, or determining, e.g., a negative result value 418 or other indication of task failure or absence of task success.

In some examples using at least one of blocks 908-914, and block 922, the first and second data items can include indications that a link was clicked. In an example of a Web page containing search results, at least one of the search results can include a redirect URL. Additionally or alternatively, control program 142 can detect click or touch events on one or more links and report them, e.g., via an XMLHttpRequest. Blocks 908 and 912 can include receiving respective data items, each data item including, e.g., a request for the redirect URL or an XMLHttpRequest transfer. Block 922 can include determining the result value 418, e.g., inversely proportional to the difference between timestamps of the first and second data items. For example, if the first link the user clicked was not useful, and the user relatively moved on to another link, the result value 418 can be lower than if the first link the user clicked was useful, as indicated by the amount of time before the user clicked on another link.

Figure 10:
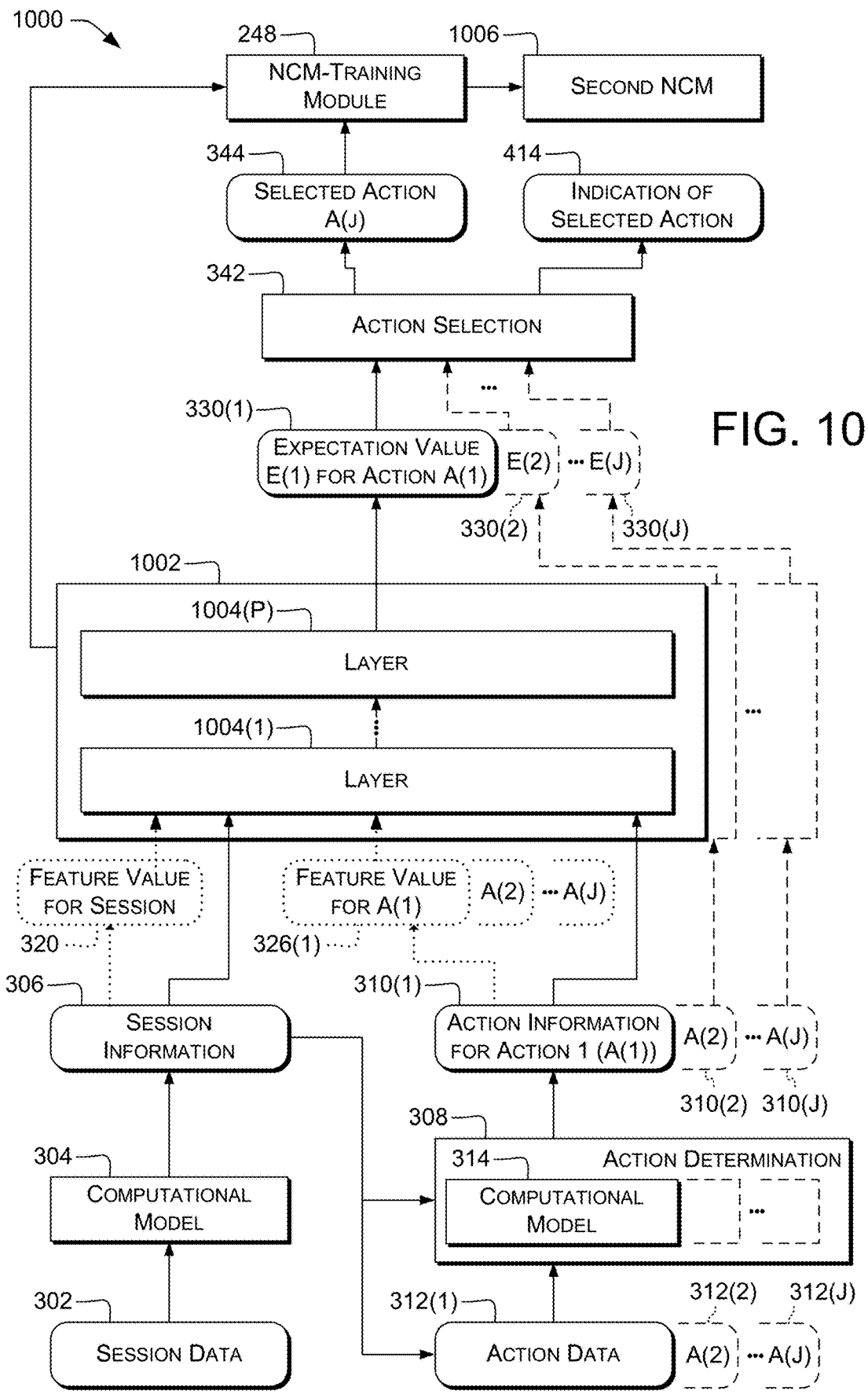
FIG. 10 is a representation of an example computational model.

FIG. 10 is a representation of an example computational model 1000 and related dataflow. Data items are shown as rounded rectangles; computations or computational blocks are shown as square-cornered rectangles. In some examples, model 1000 is operated at least one time over the course of a session, or using data related to a session.

In some examples, session data 302 is input to computational model 304, which produces session information 306. Action determination block 308 can determine information 310($j$) of one or more actions A(j), $1 \leq j \leq J$, e.g., using computational model(s) 314. These operations can be carried out as described above with reference to FIG. 3.

In some examples, action data 312($j$) can be received for at least one respective action A(j). In some examples, action determination block 308 can include operating computational model 314 using action data 312 as input to provide action information 310 as output. In some examples, action determination block 308 can include determining a representation of the action data 312($j$), e.g., by counting words in action data 312($j$) to determine a bag-of-words representation, or in other ways discussed above with reference to action data 312, FIG. 3.

In some examples, NCM-operation module 238 can operate an NCM 1002 multiple times to separately determine respective expectation values 330($j$) for actions A(j) of a plurality of actions. NCM 1002, e.g., a single-layer or multilayer perceptron, can include multiple layers 1004(1)-1004(P), and can be operated, e.g., as described above with reference to CM 316, CM 322, first NCM 406, or second NCM 412. The individual expectation values 330 can be determined based at least in part on session information 306 of the state, information 310($j$) of respective action A(j) of the plurality of actions, and common parameters of the NCM 1002. In some examples, each of the expectation values 330($j$) is determined by operating the NCM 1002 using the common parameters, e.g., common neuron weights and biases of a multilayer perceptron.

In some examples, the action-selection block 342, e.g., operated by the action-selection module 244, can select a first action 344 of the plurality of actions based at least in part on at least one of the expectation values 330, e.g., the action A(j) having the highest expectation value 330($j$). The action-selection block 342 can produce an indication 414 of the selected first action 344. Examples are discussed above, e.g., with reference to FIGS. 3 and 4.

In some examples, NCM-training module 248 can train NCM 1002 based at least in part on the selected action 344 and a result value to provide a second NCM 1006. Examples of the training of NCMs are discussed above, e.g., with reference to FIG. 3. For example, update formulas such as Eqs. (18)-(22) can be used with conventional gradient formulas for multilayer perceptrons.

In some examples, the RCM-training module 246 or the NCM-training module 248 can cooperatively train CMs 304, 314, and 1002 to determine, for example, neuron parameters of CM 1002 and parameters of CMs 304 and 314. Cooperative end-to-end training of these models, e.g., as described above with reference to FIG. 3, can permit more effectively modeling the session and more effectively responding to queries from entity 110. This can reduce the amount of bandwidth required to conduct the session with entity 110.

Figure 11:
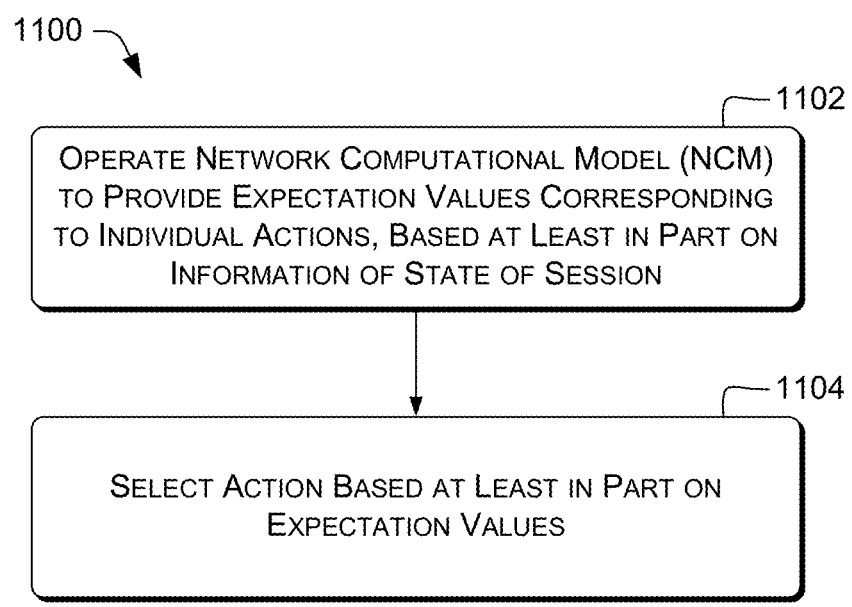
FIG. 11 is a flow diagram that illustrates example processes for operating computational models according to various examples described herein.

FIG. 11 is a flow diagram that illustrates an example process 1100 for operating a computational model.

In some examples, at block 1102, a network computational model (NCM), e.g., NCM 1002, can be operated to separately determine respective expectation values 330($j$) for actions A(j) of a plurality of actions. Individual expectation values 330($j$) of the expectation values 330 can be determined based at least in part on session information 306, e.g., of a state of a session, common parameters of the NCM 1002, and information 310($j$) of the respective action A(j) of the plurality of actions. In some examples, block 1102 can include operating one or more NCMs one or more times each to determine the expectation values 330($j$) for J actions. Examples are discussed above, e.g., with reference to FIG. 10.

In some examples, indicated by the dotted boxes and connectors, NCM 1002 can be operated based at least in part on feature value 320 of the session and feature value(s) 326($j$) of action(s) A(j), instead of or in addition to session information 306, e.g., of the state of the session, and information 310($j$) action A(j). Feature values 320 and 326 can be determined, e.g., as described above with reference to FIGS. 3 and 4. In these examples, the NCM 1002 can be operated having the feature value 320 of the session and the feature value 326($j$) of action A(j) as input to determine the expectation value of action A(j). In some examples, NCM 1002 can represent CM 340, and operations described in FIGS. 11 and 12 can be represent computational-model operation 336, FIG. 3.

In some examples, at block 1104, a first action 344 of the plurality of actions can be selected based at least in part on at least one of the expectation values 330. Examples are discussed above, e.g., with reference to action-selection block 342, action-selection module 244, and block 708.

Figure 12:
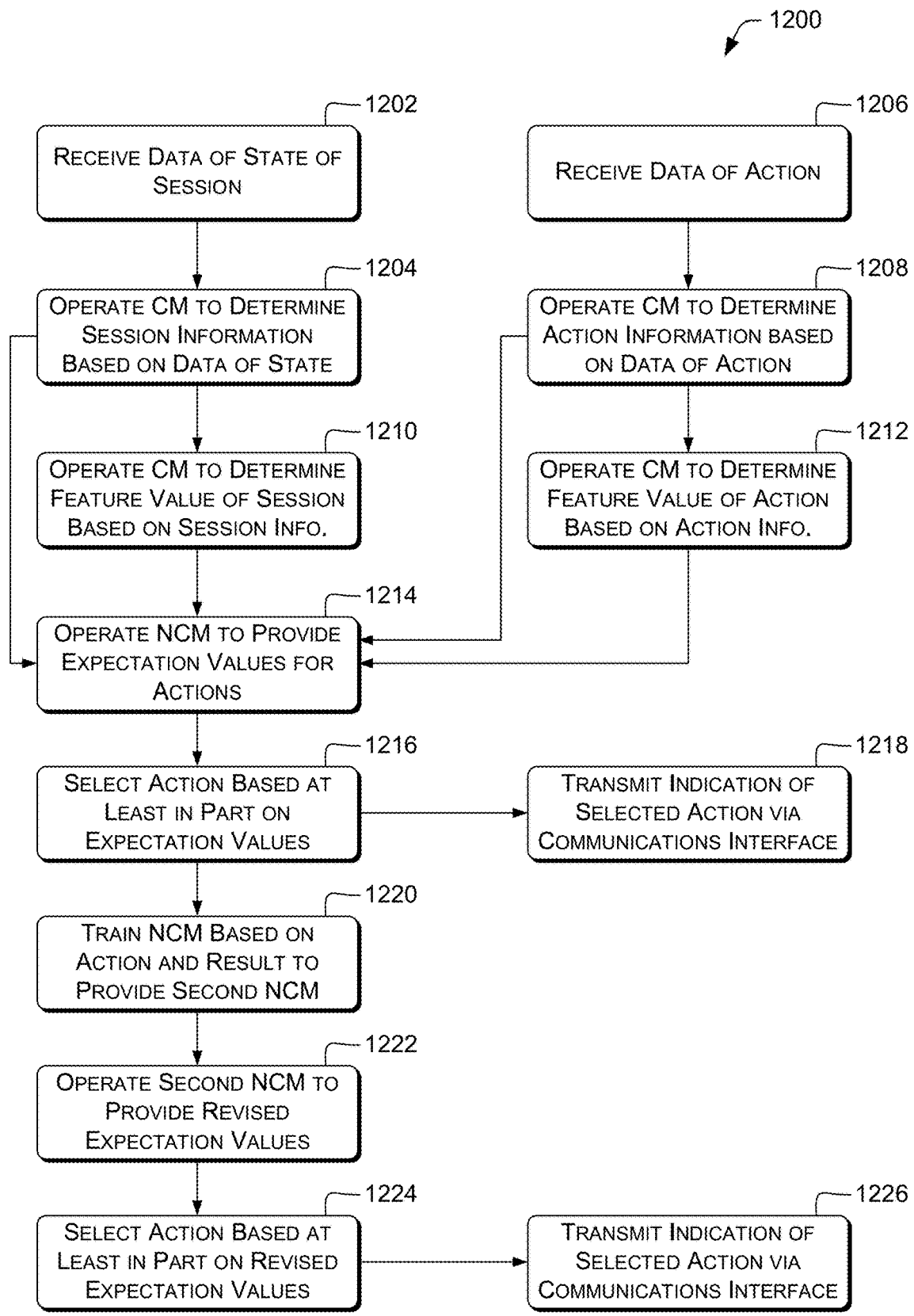
FIG. 12 is a flow diagram that illustrates example processes for training and operating computational models according to various examples described herein.

FIG. 12 is a flow diagram that illustrates an example process 1200 for training and operating a computational model. Process 1200 can operate, e.g., in the context of a session, e.g., with entity 110. Blocks 1202-1212 can be performed in any relative order provided that blocks are performed before other blocks to which they provide input.

In some examples, at block 1202, session data 302, e.g., data of at least part of the state of the session, can be received. Examples are discussed above, e.g., with reference to communications interface 232 and session data 302.

In some examples, at block 1204, a computational model such as CM 304 can be operated to determine at least part of the session information 306, e.g., of the state of the session, based at least in part on the session data 302. Block 1204 can include determining an embedding vector representing the session data 302, e.g., as discussed above with reference to FIG. 3. Block 1204 can be followed by block 1210 or block 1214.

In some examples, at block 1206, action data 312 of at least one action of the plurality of actions can be received. Examples are discussed above, e.g., with reference to action data 312, FIG. 3.

In some examples, at block 1208, a computational model such as CM 314 can be operated to determine at least part of the information 310 of the at least one action based at least in part on the action data 312, e.g., textual data. Examples are discussed above, e.g., with reference to action-determination module 240, action determination block 308, CM 314, or second RCM 410. Block 1208 can be followed by block 1212 or block 1214.

In some examples, at block 1210, a first computational model can be operated to determine a feature value 320 of the session based at least in part on the session information 306, e.g., of the state of the session. Examples are discussed above, e.g., with reference to CM 316 and first NCM 406. Block 1210 can be followed by block 1214.

In some examples, at block 1212, a second computational model can be operated to determine a feature value 326(j) of at least one action A(j) of the plurality of actions. Examples are discussed above, e.g., with reference to CM 322 and second NCM 412. Block 1220 can be followed by block 1214.

In some examples, at block 1214, which can represent block 1102, FIG. 11, an NCM can be operated to separately determine respective expectation values for actions of a plurality of actions, e.g., as discussed above with reference to block 1102. In some examples, block 1214 can include operating the NCM having the feature value 320 of the session and the feature value 326 of at least one action as input to determine the expectation value of the at least one action.

In some examples, at block 1216, which can represent block 1104, FIG. 11, a first action 344 of the plurality of actions can be selected based at least in part on at least one of the expectation values 330. Examples are discussed above, e.g., with reference to action-selection block 342, action-selection module 244, and block 708.

In some examples, at block 1218, an indication 414 of the first action 344 can be transmitted via communications interface 232, e.g., a network interface. Examples are discussed above, e.g., with reference to transmission module 256.

In some examples, at block 1220, the NCM 1002 can be trained based at least in part on the first action 344 and a result value 418 to provide a second NCM 1006. Examples are discussed above, e.g., with reference to FIGS. 3 and 10.

In some examples, at block 1222, the second NCM 1006 can be operated to separately determine respective revised expectation values 330{t+1} for the actions of the plurality of actions. The individual revised expectation values 330{t+1} can be determined based at least in part on session information 306{t+1}, e.g., of a revised state of a session, and common parameters of the second NCM 1006.

In some examples, at block 1224, a second action of the plurality of actions can be selected based at least in part on at least one of the revised expectation values 330{t+1}. Examples are discussed above, e.g., with reference to block 1104.

In some examples, at block 1226, an indication of the second action can be transmitted via the communications interface 232. Examples are discussed above, e.g., with reference to block 1218.

Illustrative Results

Simulations were performed of playing text-based interactive-fiction games using various configurations described herein of computational models. Such games can serve as proxies for user-interaction tasks since they involve textual state information and textual actions that can be taken to change the state. Rewards in the simulations are expressed in game scores, which can be positive (for desirable outcomes) or negative (for undesirable outcomes). Two games were tested: "Saving John," a deterministic choice-based game, and "Machine of Death," a stochastic hypertext-based game. At any point in "Saving John," the player can choose one of up to four actions, so J≤4; at any point in "Machine of Death," J≤9.

In the experiments, the session information 306 was a bag-of-words representation of the current game state, i.e., the situation being presented textually to the player. The information 310(j) of action A(j) was a bag-of-words representation of the text of that action, e.g., choice to select or link to click.

Results for "Saving John" are shown in Table 2. Score means and standard deviations ("stdev") are shown. "Hidden dimension" is the number of neurons in each hidden layer. The tested models were a linear model, two deep Q-learning networks (DQN) with one and two hidden layers, respectively, and two models such as those shown in FIG. 3 ("DRRN" models) with one and two hidden layers, respectively. Table 2 shows that the DRRN models achieved significantly higher scores than the linear or DQN models.

TABLE 2

| | Evaluation metric: | | | | | | | |
|---|---|---|---|---|---|---|---|---|
| | Mean | Stdev | Mean | Stdev | Mean | Stdev | Mean | Stdev |
| | | | Hidden dimension: | | | | | |
| | 10 | 10 | 20 | 20 | 50 | 50 | 100 | 100 |
| Linear | 4.46 | −0.48 | N/A | N/A | N/A | N/A | N/A | N/A |
| DQN (1-hidden) | 2.68 | 2.22 | 2.92 | 3.14 | 4.05 | 4.21 | 5.98 | 2.57 |
| DQN (2-hidden) | −3.46 | 2.2 | 4.9 | 3.24 | 9.01 | 3.25 | 7.12 | 3.18 |
| DRRN (1-hidden) | 11.47 | 1.1 | 17.14 | 0.62 | 18.33 | 0.28 | 18.22 | 0.22 |
| DRRN (2-hidden) | 13.84 | 0.72 | 18.45 | 0.11 | 18.51 | 0.35 | 18.7 | 0.41 |

Results for "Machine of Death" are shown in Table 3. Table 3 shows that the DRRN models, e.g., as shown in FIG. 3, achieved higher scores than the linear or DQN models.

Table 3 also shows that Concatenation+DNN models such as those shown in FIG. 10 and discussed above with reference to blocks 1210-1214, FIG. 12, outperform the linear or DQN models.

TABLE 3

| | Evaluation metric | | | | | | | |
|---|---|---|---|---|---|---|---|---|
| | Mean | Stdev | Mean | Stdev | Mean | Stdev | Mean | Stdev |
| | | | | hidden dimension | | | | |
| | 10 | 10 | 20 | 20 | 50 | 50 | 100 | 100 |
| Linear | 3.38 | 1.02 | N/A | N/A | N/A | N/A | N/A | N/A |
| DQN, 1-hidden | 2.11 | 1.6 | 2.05 | 1.26 | 3.76 | 1.63 | 4.89 | 2.91 |
| DQN, 2-hidden | −0.43 | 3.32 | 2.82 | 0.98 | 4.35 | 0.95 | 5.23 | 1.2 |
| DRRN, 1-hidden | 7.69 | 1.26 | 7.24 | 1.59 | 8.47 | 1.36 | 8.79 | 0.98 |
| DRRN, 2-hidden | 9.13 | 2.89 | 9.22 | 2.19 | 10.76 | 2.77 | 11.21 | 0.69 |
| Concatenation + DNN, 2-hidden | 8.39 | 2.07 | 8.65 | 1.35 | 9.31 | 0.44 | 9.8 | 2.45 |

In a further experiment, eight human players played "Machine of Death," scoring an average of −5.5. Therefore, DRRN and Concatenation+DNN models outperformed novice human players in this experiment.

Example Clauses

A: A system, comprising: a communications interface; one or more processing unit(s) adapted to execute modules; and one or more computer-readable media having thereon a plurality of modules, the plurality of modules comprising: a module of a representation engine that is configured to: operate a first network computational model (NCM) based at least in part on information of a session to provide a first feature value corresponding to the session; and operate a second NCM to provide respective second feature values corresponding to individual actions of a plurality of actions; a module of an action engine that is configured to: determine respective expectation values of at least some of the actions of the plurality of actions based at least in part on the first feature value and the respective second feature values; and select a first action of the plurality of actions based at least in part on at least one of the expectation values; a module of a training engine that is configured to: train the first NCM based at least in part on the first action and a result value to provide a third NCM; train the second NCM based at least in part on the first action and the result value to provide a fourth NCM; and a module of a communications engine that is configured to: provide an indication of the first action via the communications interface; determine result information; and determine the result value based at least in part on the result information.

B: A system as recited in paragraph A, wherein the communications engine is configured to receive the result information via the communications interface.

C: A system as recited in paragraph A or B, wherein the communications engine is further configured to determine the result information based at least in part on determining that a selected timeout period has elapsed without receiving a response to the indication of the first action.

D: A system as recited in any of paragraphs A-C, wherein the communications engine is further configured to: receive a first data item and a second data item via the communications interface, the first data item and the second data items associated with the session; and determine the result information by determining a duration between a timestamp of receipt of the first data item and a timestamp of receipt of the second data item.

E: A system as recited in any of paragraphs A-D, wherein the first NCM and the second NCM comprise respective neural networks and the training engine is configured to train the first NCM and the second NCM using a reinforcement-learning update rule.

F: A system as recited in any of paragraphs A-E, wherein: the first feature value and the second feature value corresponding to a first action of the plurality of actions comprise respective vectors; and the action engine is configured to determine the expectation value corresponding to the first action as an inner product of the first feature value and the second feature value corresponding to the first action.

G: A system as recited in any of paragraphs A-F, wherein the training engine is configured to: train the first NCM further based on at least one of the second feature values; and train the second NCM further based on at least the first feature value.

H: A system as recited in any of paragraphs A-G, wherein the representation engine is further configured to: receive data of the session; and determine at least part of the information of the session based at least in part on the data.

I: A system as recited in paragraph H, wherein the representation engine is further configured to operate a recurrent computational model (RCM) to determine the at least part of the information of the session based at least in part on the data.

J: A system as recited in paragraph I, wherein the training engine is further configured to train the RCM based at least in part on training data.

K: A system as recited in paragraph I or J, wherein the training engine is further configured to train the RCM based at least in part on the selected action and the result value.

L: A system as recited in any of paragraphs A-K, wherein the action engine is further configured to determine at least one of the actions based at least in part on a knowledge base.

M: A system as recited in any of paragraphs A-L, wherein the communications engine is further configured to receive the information of the session via the communications interface.

N: A system as recited in any of paragraphs A-M, wherein the representation engine is further configured to receive data of at least one of the actions; and determine at least part of the information of the at least one of the actions based at least in part on the data.

O: A system as recited in any of paragraphs A-N, wherein the training engine is configured to train at least one of the first NCM or the second NCM in response to a task-complete indication, e.g., received via the communications interface.

P: A system as recited in any of paragraphs A-O, wherein the training engine is configured to train at least one of the first NCM or the second NCM based at least in part on dwell-time information.

Q: A system as recited in any of paragraphs A-P, wherein the first NCM and the second NCM comprise respective neural networks and the training engine is configured to train the first NCM and the second NCM using stochastic gradient descent.

R: A system as recited in any of paragraphs A-Q, wherein the first feature value and the second feature value corresponding to a first action of the plurality of actions comprise respective vectors; and the action engine is configured to determine the expectation value corresponding to the first action as a bilinear combination of the first feature value, a bilinear-interpolation matrix, and the second feature value corresponding to the first action.

S: A system as recited in any of paragraphs A-R, wherein the action engine is configured to determine the expectation value corresponding to the first action by operating a computational model having as input at least part of the first feature value and at least part of the second feature value corresponding to the first action.

T: A computer-readable medium including at least one of the modules as recited in any of paragraphs A-S.

U: A method, comprising: determining a first feature value corresponding to a session by operating a first network computational model (NCM) based at least in part on information of the session; determining respective second feature values corresponding to individual actions of a plurality of actions by operating a second NCM, wherein the second NCM uses a common set of parameters in determining the second feature values; determining respective expectation values associated with at least some of the actions of the plurality of actions based at least in part on the first feature value and the respective second feature values; and selecting a first action of the plurality of actions based at least in part on at least one of the expectation values.

V: A method as recited in paragraph U, further comprising: receiving textual data of at least one action of the plurality of actions; determining a representation of the textual data; and determining the second feature value corresponding to the at least one action based at least in part on the representation.

W: A method as recited in paragraph U or V, further comprising: receiving at least one data item via a network interface; determining the information of the session based at least in part on the at least one data item; and transmitting an indication of the first action via the network interface.

X: A method as recited in paragraph W, further comprising determining a result value based at least in part on a timestamp of receipt of the at least one data item.

Y: A method as recited in paragraph W or X, further comprising determining a result value based at least in part on a timestamp of transmission of the indication.

Z: A method as recited in any of paragraphs U-Y, further comprising: training the first NCM based at least in part on the first action and a result value to provide a third NCM; and training the second NCM based at least in part on the first action and the result value to provide a fourth NCM.

AA: A method as recited in paragraph Z, wherein the first NCM and the second NCM comprise respective neural networks and the training engine is configured to train the first NCM and the second NCM using a reinforcement-learning update rule.

AB: A method as recited in paragraph Z or AA, further comprising receiving the result value via a network interface.

AC: A method as recited in any of paragraphs Z-AB, further comprising determining the result value based at least in part on respective timestamps of a plurality of data items received via a network interface.

AD: A method as recited in any of paragraphs Z-AC, further comprising: determining a first revised feature value corresponding to the session by operating the third NCM based at least in part on revised information of the session; determining respective second revised feature values corresponding to at least two of the actions of the plurality of actions by operating the fourth NCM, wherein the training the second NCM includes determining a common revised set of parameters and the fourth NCM uses the common revised set of parameters in determining the second feature values; determining respective revised expectation values associated with the at least two of the actions based at least in part on the first revised feature value and the respective second revised feature values; and selecting a second action of the plurality of actions based at least in part on at least one of the revised expectation values.

AE: A method as recited in any of paragraphs Z-AD, wherein the first NCM and the second NCM comprise respective neural networks and the method further comprises training the first NCM and the second NCM using stochastic gradient descent.

AF: A method as recited in any of paragraphs Z-AE, further comprising training the first NCM and the second NCM based at least in part on dwell-time information.

AG: A method as recited in any of paragraphs Z-AF, further comprising training receiving a task-complete indication, e.g., via the communications interface, and training at least one of the first NCM or the second NCM in response to the task-complete indication.

AH: A method as recited in any of paragraphs U-AG, further comprising: receiving textual data of corresponding to the session; determining a representation of the textual data; and determining the first feature value corresponding to the session based at least in part on the representation.

AI: A method as recited in any of paragraphs U-AH, wherein the first feature value and the second feature value corresponding to a first action of the plurality of actions comprise respective vectors; and the method further comprises determining the expectation value corresponding to the first action as an inner product of the first feature value and the second feature value corresponding to the first action.

AJ: A method as recited in any of paragraphs U-AI, wherein the first feature value and the second feature value corresponding to a first action of the plurality of actions comprise respective vectors; and the method further comprises determining the expectation value corresponding to the first action as a bilinear combination of the first feature value, a bilinear-interpolation matrix, and the second feature value corresponding to the first action.

AK: A method as recited in any of paragraphs U-AJ, wherein the method further comprises determining the expectation value corresponding to the first action by operating a computational model having as input at least part of the first feature value and at least part of the second feature value corresponding to the first action.

AL: An apparatus, comprising: at least one processor; and a computer-readable medium (CRM) including instructions to, when executed by the at least one processor, cause the at least one processor to: operate a network computational model (NCM) to separately determine respective expectation values for actions of a plurality of actions, individual expectation values determined based at least in part on: information of a state of a session; common parameters of the NCM; and information of the respective action of the plurality of actions; and select a first action of the plurality of actions based at least in part on at least one of the expectation values.

AM: An apparatus as recited in paragraph AL, the instructions further to cause the at least one processor to: train the network computational model based at least in part on the first action and a result value to provide a second NCM; operate the second NCM to separately determine respective revised expectation values for the actions of the plurality of actions, the individual revised expectation values determined based at least in part on: information of a revised state of a session; and common parameters of the second NCM;

and select a second action of the plurality of actions based at least in part on at least one of the revised expectation values.

AN: An apparatus as recited in paragraph AL or AM, the instructions further to cause the at least one processor to: operate a first computational model to determine a feature value of the session based at least in part on the information of the state of the session; operate a second computational model to determine a feature value of the first action of the plurality of actions; and operate the NCM having the feature value of the session and the feature value of the first action as input to determine the expectation value of the first action.

AO: An apparatus as recited in any of paragraphs AL-AN, wherein the information of the state of the session comprises text and the feature value of the session comprises a vector.

AP: An apparatus as recited in any of paragraphs AL-AO, the instructions further to cause the at least one processor to: receive data of at least part of the state of the session; and operate a computational model to determine at least part of the information of the state of the session based at least in part on the data.

AQ: An apparatus as recited in any of paragraphs AL-AP, the instructions further to cause the at least one processor to transmit an indication of the first action via a communications interface.

AR: An apparatus as recited in any of paragraphs AL-AQ, the instructions further to cause the at least one processor to receive data of at least one action of the plurality of actions; and operate a computational model to determine at least part of the information of the at least one action based at least in part on the data.

AS: An apparatus as recited in any of paragraphs AL-AR, the instructions further to cause the at least one processor to receive data of the state of the session; and operate a computational model to determine at least part of the information of the state of the session based at least in part on the data.

AT: An apparatus as recited in any of paragraphs AL-AS, the instructions further to cause the at least one processor to determine result information and train the NCM based at least in part on the result information to provide a second NCM.

AU: An apparatus as recited in paragraph AT, the instructions further to cause the at least one processor to determine a result value based at least in part on the result information and to train the NCM based at least in part on the result value.

AV: An apparatus as recited in paragraph AT or AU, the instructions further to cause the at least one processor to receive the result information via a communications interface.

AW: An apparatus as recited in any of paragraphs AT-AV, the instructions further to cause the at least one processor to transmit an indication of the first action; and determine the result information based at least in part on determining that a selected timeout period has elapsed without receiving a response to the indication of the first action.

AX: An apparatus as recited in any of paragraphs AT-AW, wherein the first NCM comprises a neural networks and the instructions further cause the at least one processor to train the first NCM using a reinforcement-learning update rule.

AY: An apparatus as recited in any of paragraphs AT-AX, the instructions further to cause the at least one processor to train the NCM in response to a task-complete indication, e.g., received via a communications interface.

AZ: An apparatus as recited in any of paragraphs AT-AY, the instructions further to cause the at least one processor to transmit an indication of the first action; receive a data item via a communications interface; and determine the result information based at least in part on a timestamp of receipt of the data item.

BA: A computer-readable medium, e.g., a computer storage medium, having thereon computer-executable instructions, the computer-executable instructions upon execution configuring a computer to perform operations as any of paragraphs U-AJ recites.

BB: A device comprising: a processor; and a computer-readable medium, e.g., a computer storage medium, having thereon computer-executable instructions, the computer-executable instructions upon execution by the processor configuring the device to perform operations as any of paragraphs U-AJ recites.

BC: A system comprising: means for processing; and means for storing having thereon computer-executable instructions, the computer-executable instructions including means to configure the system to carry out a method as any of paragraphs U-AJ recites.

BD: A system, comprising: at least one processor; a communications interface communicatively coupled to the at least one processor; a data store operably communicatively coupled to the at least one processor and configured to store data of a user profile associated with a user; and a computer-readable medium including instructions to, when executed by the at least one processor, cause the at least one processor to: receive a query via the communications interface, the query associated with the user; determine a first feature value by operating a first computational model based at least in part on at least a portion of the query and at least a portion of the data of the user profile; determine a plurality of responses based at least in part on at least a portion of the query; determine respective second feature values corresponding to individual responses of the plurality of responses by operating a second computational model, wherein the second computational model uses a common set of parameters in determining the second feature values; determine respective expectation values of at least some of the responses of the plurality of responses based at least in part on the first feature value and the respective second feature values; and select at least one response of the plurality of responses based at least in part on at least one of the expectation values; and transmit the at least one response via the communications interface.

BE: A system as paragraph BD recites, the instructions further to cause the at least one processor to determine the second feature values based on information of types also present in the user profile (e.g., whether movie showtimes match the user's expressed preferences).

BF: A system as paragraph BD or BE recites, the instructions further to cause the at least one processor to determine the second feature values based on information in a knowledge base (e.g., transactional information of product cost and availability).

BG: A system as any of paragraphs BD-BF recites, the instructions further to cause the at least one processor to determine the result value and training the system, e.g., as in any of paragraphs Z-AB.

BH: A system as any of paragraphs BD-BG recites, the instructions further to cause the at least one processor to determining the result value specifically based on feedback from the user's Web browser or other client, e.g., as in any of paragraphs B-D or AC.

BI: A system as any of paragraphs BD-BH recites, the instructions further to cause the at least one processor to operate the trained model to continue a dialog with the user, e.g., as in paragraph AD.

BJ: A method, comprising: determining a first feature value by operating a first computational model based at least in part on at least a portion of a profile associated with a user; determining a plurality of responses based at least in part on at least a portion of a query associated with the user; determining respective second feature values corresponding to individual responses of the plurality of responses by operating a second computational model; determining respective expectation values of at least some of the responses of the plurality of responses based at least in part on the first feature value and the respective second feature values; selecting at least one response of the plurality of responses based at least in part on at least one of the expectation values; and updating the profile based at least in part on the at least one response to provide an updated profile.

BK: A method as paragraph BJ recites, further comprising determining the first feature value further based on the query.

BL: A method as paragraph BJ or BK recites, further comprising operating the computational models to continue a dialog with the user (e.g., whether or not the models are trained in between queries).

BM: A method as any of paragraphs BJ-BL recites, further comprising determining the result value for the at least one response, e.g., as in any of paragraphs Z-AD BN: A method as any of paragraphs BJ-BM recites, further comprising determining the result value specifically based on feedback from the user's Web browser or other client, e.g., as in any of paragraphs B-D or AC.

BO: A method as any of paragraphs BJ-BN recites, further comprising training the models based on a minibatch of accumulated response and result information.

BP: A method as any of paragraphs BJ-BO recites, further comprising determining the second feature values based on information of types also present in the user profile (e.g., whether movie showtimes match the user's expressed preferences).

BQ: A method as any of paragraphs BJ-BP recites, further comprising determining the second feature values based on information in a knowledge base (e.g., transactional information of product cost and availability).

BR: A device, comprising: at least one processor; a communications interface communicatively coupled to the at least one processor; a user interface operably communicatively coupled to the at least one processor; and a computer-readable medium including instructions to, when executed by the at least one processor, cause the at least one processor to: receive a query via the user interface; transmit at least a portion of the query via the communications interface; receive at least one response via the communications interface; present the at least one response via the user interface; subsequently, detect operation information of operation of the user interface; and transmit result information via the communications interface, the result information based at least in part on the operation information.

BS: A device as paragraph BR recites, wherein the result information includes the operation information (e.g., raw timestamps), e.g., as in paragraph B.

BT: A device as paragraph BR or BS recites, the instructions further to cause the at least one processor to determine the result information based on the operation information (e.g., by computing time differences between user actions).

BU: A device as any of paragraphs BR-BT recites, wherein the result information indicates a dwell time of viewing of the at least one response, e.g., as in paragraph C.

BV: A device as any of paragraphs BR-BU recites, wherein the at least one response includes a search-results page presented via a Web browser.

CONCLUSION

Various computational-model training and operation techniques described herein can permit more efficiently analyzing data, e.g., of a session such as a communication session with an entity, and more readily determining actions to be taken in that session, e.g., to assist the entity in achieving a goal. Various examples can provide more effective ongoing training of multiple computational models, e.g., based on interactions over the course of the session, providing improved accuracy compared to prior schemes. Various examples can reduce the time or memory requirements of training while maintaining or improving accuracy.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 114, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more computers and/or processors. The code modules can be embodied in any type of computer-readable medium. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "at least X, Y, or Z," or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system, comprising:
   one or more processing unit(s) adapted to execute modules; and
   one or more computer-readable media having thereon a plurality of modules, the plurality of modules comprising:
      a module of a representation engine that is configured to:
         operate a first network computational model (NCM) on a vector representation of state text associated with a state of a session to provide a first feature vector representing the state of the session; and
         operate a second NCM on vector representations of action text associated with a plurality of actions to provide, independently from the first feature vector, a plurality of second feature vectors representing respective individual actions of the plurality of actions; and
      a module of an action engine that is configured to:
         determine respective scalar expectation values of at least some of the actions of the plurality of actions by combining the first feature vector with the respective second feature vectors; and
         select a first action of the plurality of actions based at least in part on the expectation values.

2. A system as recited in claim 1, further comprising a communications interface, wherein the plurality of modules further comprise:
   a module of a communications engine that is configured to:
      provide an indication of the first action via the communications interface; and
      receive result information via the communications interface.

3. A system as recited in claim 2, wherein the communications engine is further configured to determine that a selected timeout period has elapsed without receiving a response to the indication of the first action.

4. A system as recited in claim 2, wherein the communications engine is further configured to:
   receive a first data item and a second data item via the communications interface, the first data item and the second data item associated with the session; and
   determine a duration between a timestamp of receipt of the first data item and a timestamp of receipt of the second data item.

5. A system as recited in claim 1, wherein the first NCM and the second NCM comprise respective neural networks and the plurality of modules further comprises:
   a module of a training engine configured to cooperatively train the first NCM and the second NCM using a reinforcement-learning update rule, wherein parameters of the first NCM and the second NCM are each updated based at least in part on outputs of both the first NCM and the second NCM.

6. A system as recited in claim 1, wherein:
   the action engine is configured to determine the scalar expectation values of the at least some of the actions as inner products of the first feature vector and the respective second feature vectors.

7. A method, comprising:
   determining a first feature vector representing a state of a session by operating a first network computational model (NCM) on a vector representation of state text associated with a state of the session;
   determining, independently from the determination of the first feature vector, a plurality of second feature vectors representing respective individual actions of a plurality of actions by operating a second NCM on vector representations of action text associated with the plurality of actions;
   determining respective scalar expectation values associated with at least some of the actions of the plurality of actions by combining the first feature vector with the respective second feature vectors; and
   selecting a first action of the plurality of actions based at least in part on at least one of the expectation values.

8. A method as recited in claim 7, further comprising:
   receiving at least one data item via a network interface;
   determining the state text based at least in part on the at least one data item; and
   transmitting an indication of the first action via the network interface.

9. A method as recited in claim 7, wherein the first NCM and the second NCM comprise respective neural networks, the method further comprising training the first NCM and the second NCM using a reinforcement-learning update rule.

10. A method as recited in claim 8, further comprising receiving a result value via the network interface.

11. A method as recited in claim 8, further comprising determining a result value based at least in part on respective timestamps of a plurality of data items received via the network interface.

12. A method as recited in claim 7, further comprising:
   determining a first revised feature vector representing the state of the session by operating the first NCM, following updating of weights of the first NCM;
   determining respective second revised feature vectors representing at least two of the actions of the plurality of actions by operating the second NCM, following updating of weights of the second NCM;

determining respective revised expectation values associated with the at least two of the actions based at least in part on the first revised feature vector and the respective second revised feature vectors; and selecting a second action of the plurality of actions based at least in part on at least one of the revised expectation values.

13. A computer-readable medium including instructions to, when executed by the at least one processor, cause the at least one processor to:

operate a first network computational model (NCM) on a vector representation of state text associated with a state of a session to provide a first feature vector representing the state of the session;

operate a second NCM based on vector representations of action text associated with a plurality of actions to provide, independently from the first feature vector, a plurality of second feature vectors representing respective individual actions of the plurality of actions;

determine respective scalar expectation values for actions of the plurality of actions by combining the first feature vector with the respective second feature vectors; and select a first action of the plurality of actions based at least in part on the expectation values.

14. A computer-readable medium as recited in claim 13, the instructions further to cause the at least one processor to:

operate the first and second NCMs to separately determine a revised first feature vector and revised second feature vectors and determine respective revised expectation values for the actions of the plurality of actions, the revised first feature vector being determined based at least in part on revised state text; and select a second action of the plurality of actions based at east in part on the revised expectation values.

15. A computer-readable medium as recited in claim 13, the instructions further to cause the at least one processor to:

operate a computational model to determine the vector representation of the state text associated with the session.

16. A computer-readable medium as recited in claim 13, the instructions further to cause the at least one processor to:

cooperatively train the first NCM and the second NCM using a reinforcement-learning update rule, wherein parameters of the first NCM and the second NCM are each updated based at least in part on outputs of both the first NCM and the second NCM.

\* \* \* \* \*